United States Patent [19]
Griner et al.

[11] 3,958,912
[45] May 25, 1976

[54] APPARATUS FOR AND METHOD OF MAKING PASTRY CUPS AND THE LIKE

[75] Inventors: Arthur J. Griner, Wyckoff; Daniel Anthony Koppa, Bloomfield, both of N.J.

[73] Assignee: Nabisco, Inc., East Hanover, N.J.

[22] Filed: Jan. 4, 1971

[21] Appl. No.: 103,707

[52] U.S. Cl. ............................................ 425/348 S
[51] Int. Cl.² ......................................... A21B 5/02
[58] Field of Search .......... 425/348, 432, 350, 347, 425/414

[56] References Cited
UNITED STATES PATENTS

| | | | |
|---|---|---|---|
| 1,062,157 | 5/1913 | Hitchcock | 425/348 S X |
| 1,257,498 | 2/1918 | Lanier | 425/348 S |
| 1,369,048 | 2/1921 | Phillips | 425/348 S X |
| 1,708,898 | 4/1929 | Roberts | 425/348 S X |
| 1,732,096 | 10/1929 | Lapkin | 425/348 S X |
| 1,981,862 | 11/1934 | Grosset et al. | 425/348 S X |
| 3,276,398 | 10/1966 | Lampros et al. | 425/432 |

*Primary Examiner*—Francis S. Husar
*Assistant Examiner*—David S. Safran
*Attorney, Agent, or Firm*—Dale A. Bauer; Irving A. Strombeck

[57] ABSTRACT

Apparatus for and method of making products, such as pastry cups, ice cream cones and the like, by baking batter in split molds carried by mold bars, the molds cooperating with removable cores carried by core bars selectively latched to the mold bars. The mold bars are mounted on a continuously operating conveyor by which they are progressively carried through an oven, a core bar removing station, a mold opening and product removing station, mold closing and mold charging stations, a core bar replacement station, a core bar jogging station, and a core bar latching station. When the core bars with their cores are removed from the mold bars, they are temporarily stored on and carried by the conveyor. The apparatus includes split molds with mold opening and closing means; mechanism for removing core bars from mold bars, storing the core bars, and reapplying them to the mold bars; means for centering the core bars on the mold bars to thus register the cores with the mold cavities; mechanism for latching and unlatching the core bars; and means for removing the product from the molds and forwarding the same to a product trimming station.

21 Claims, 40 Drawing Figures

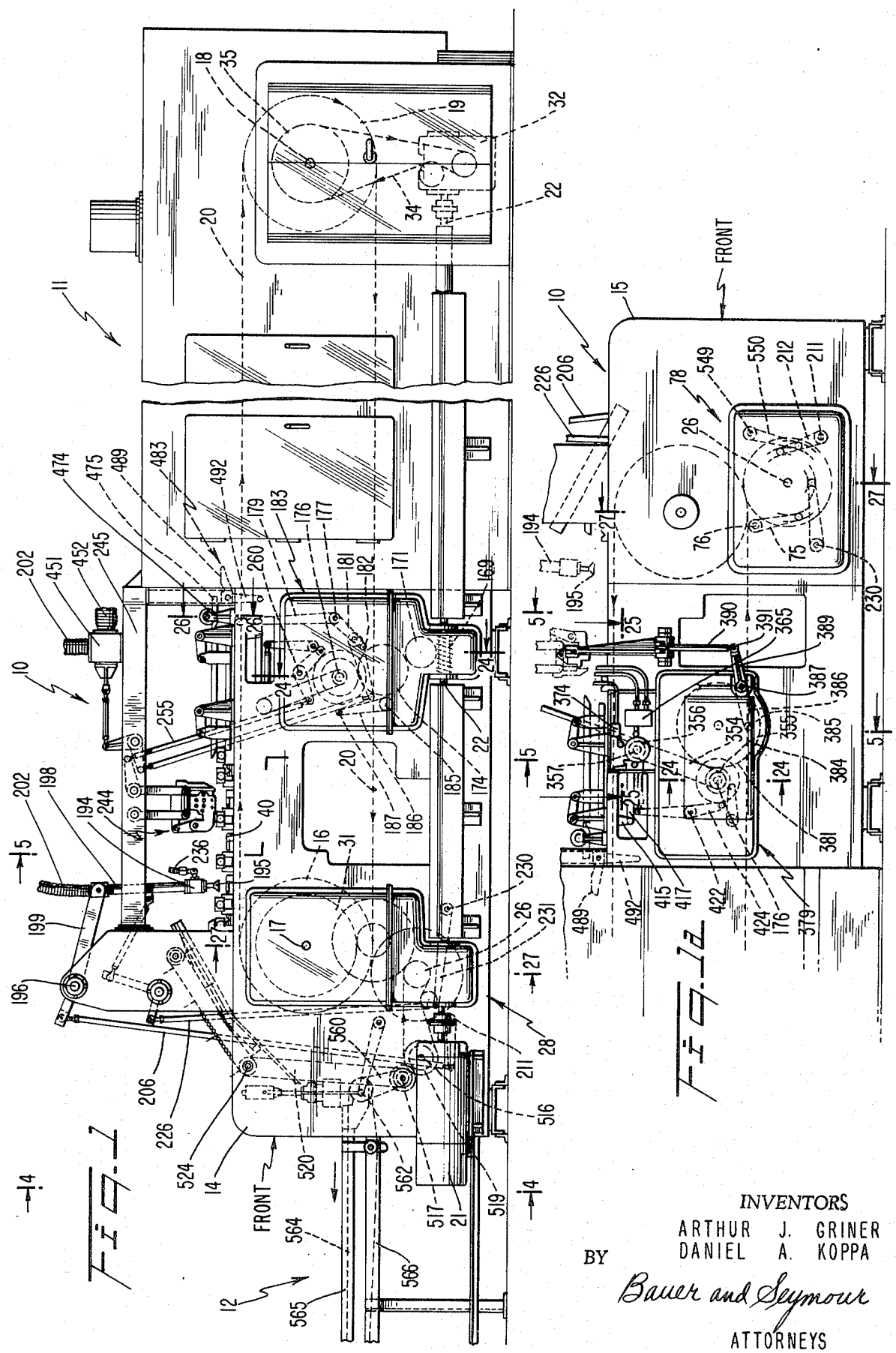

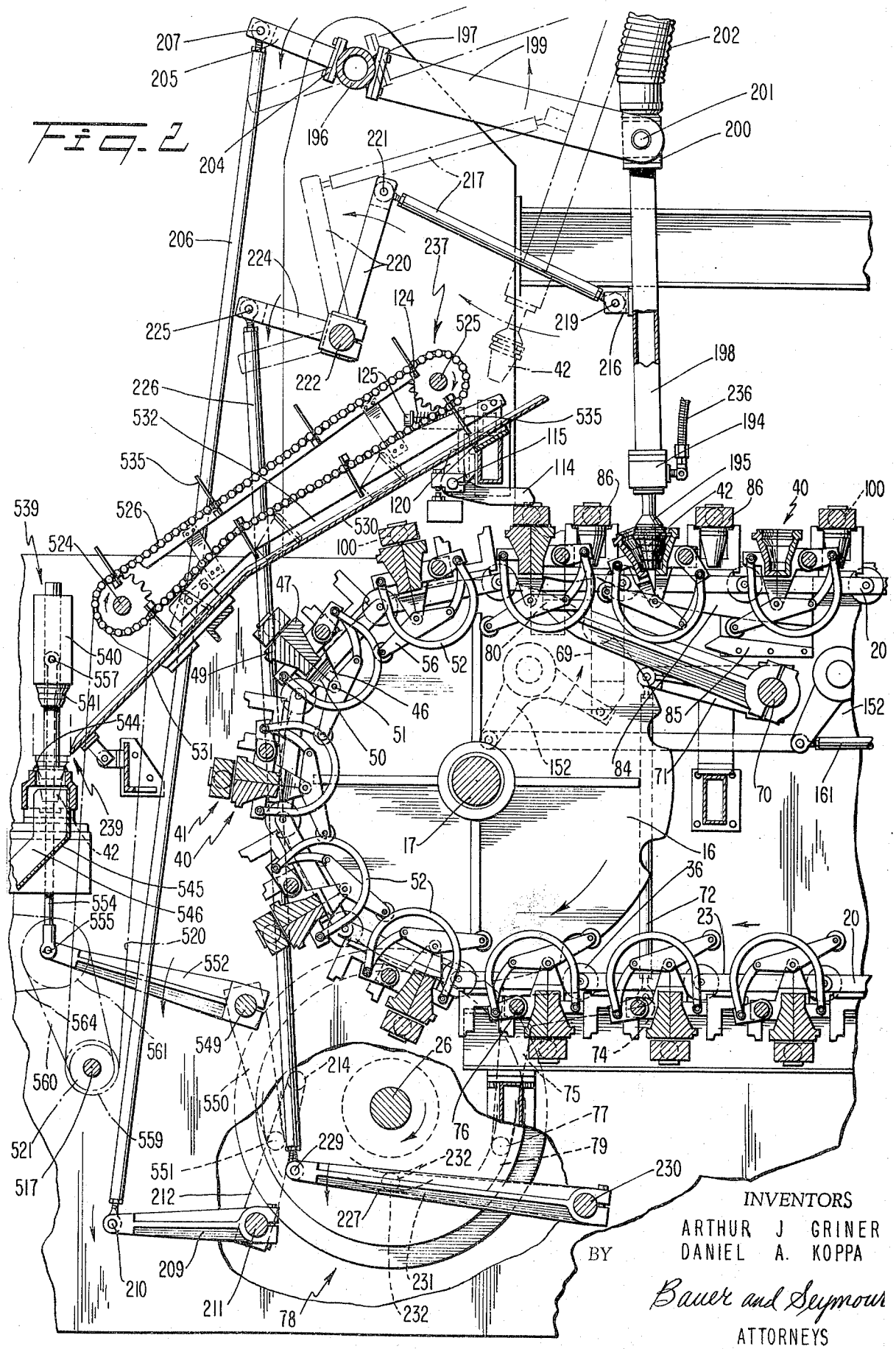

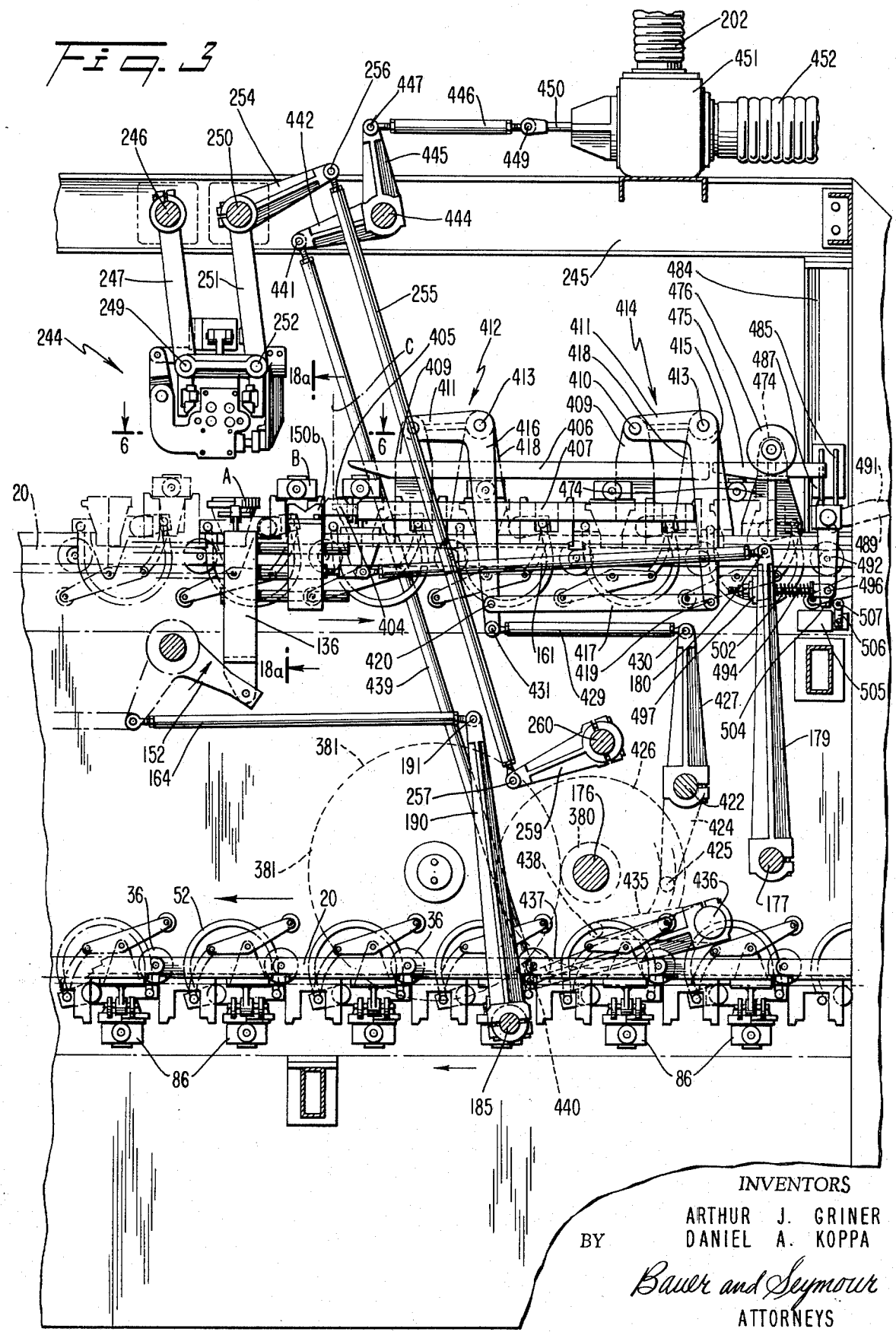

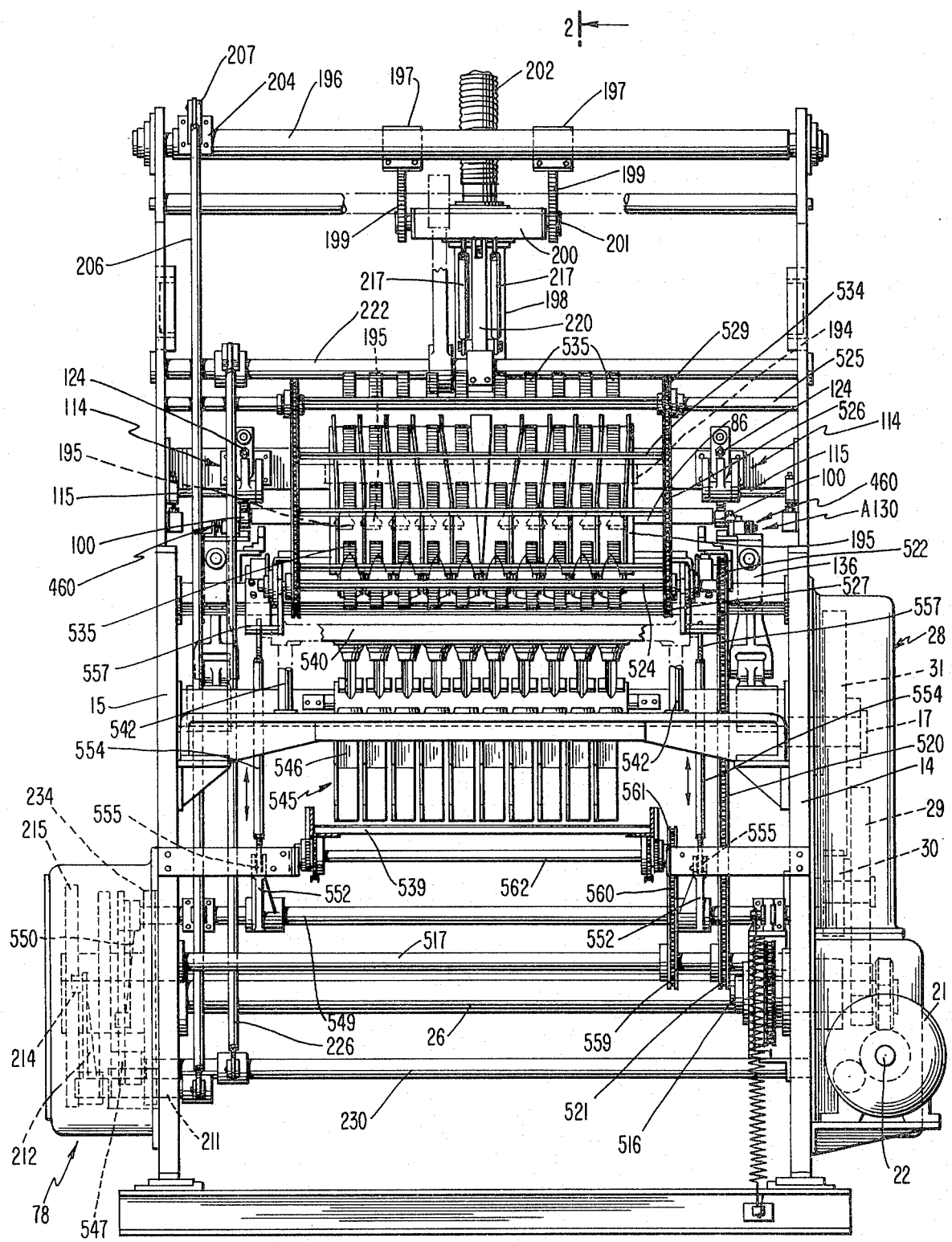

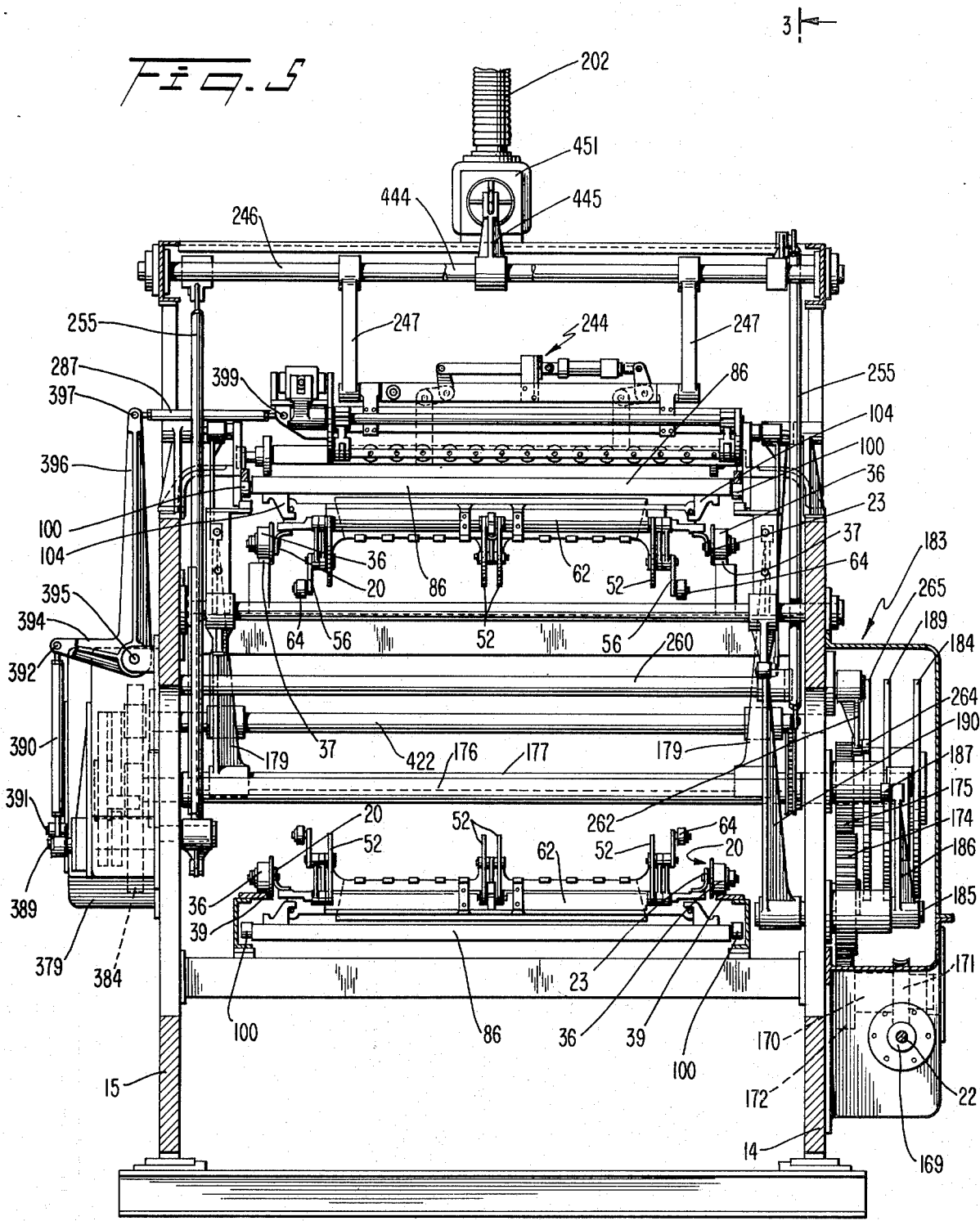

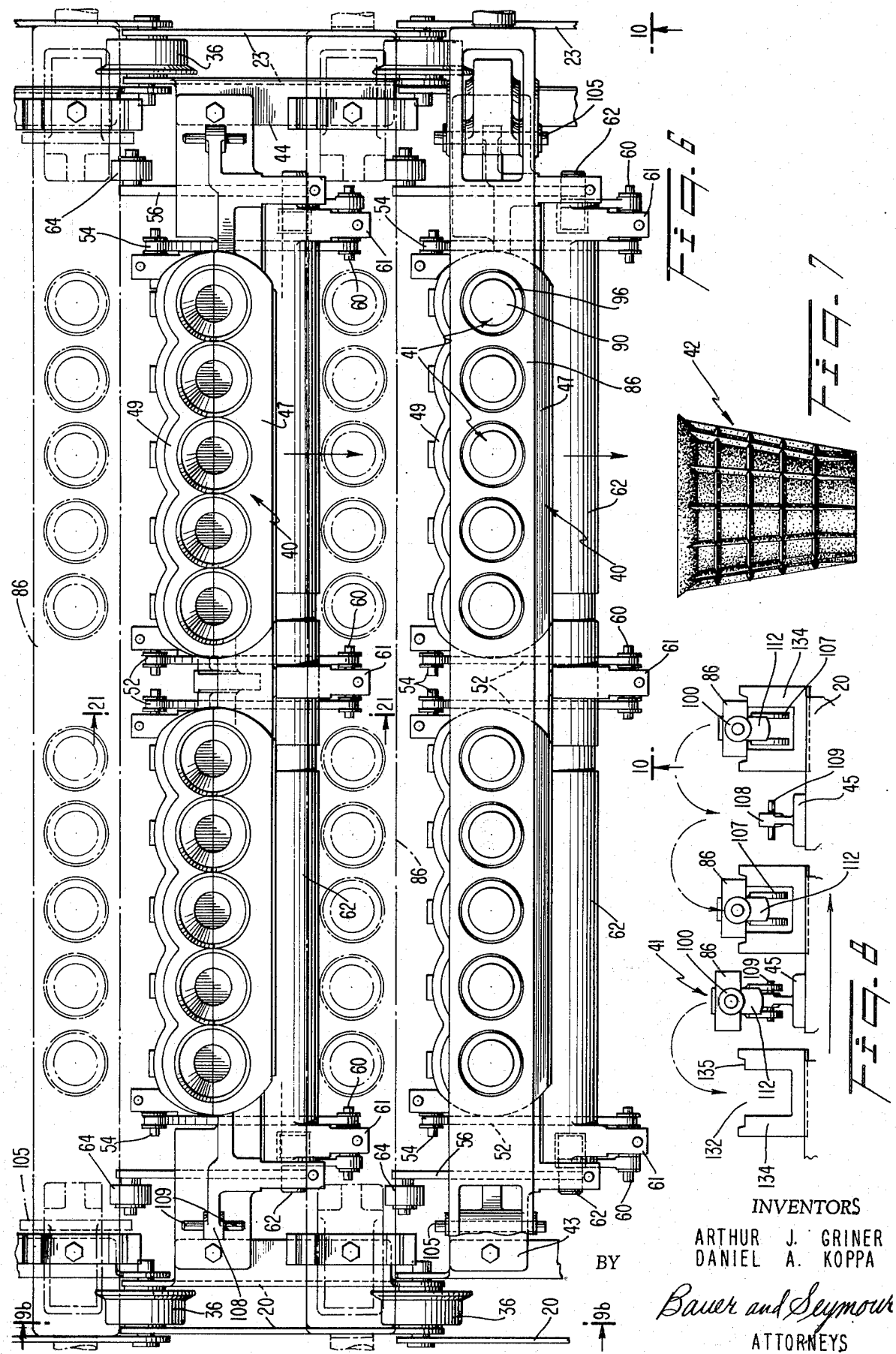

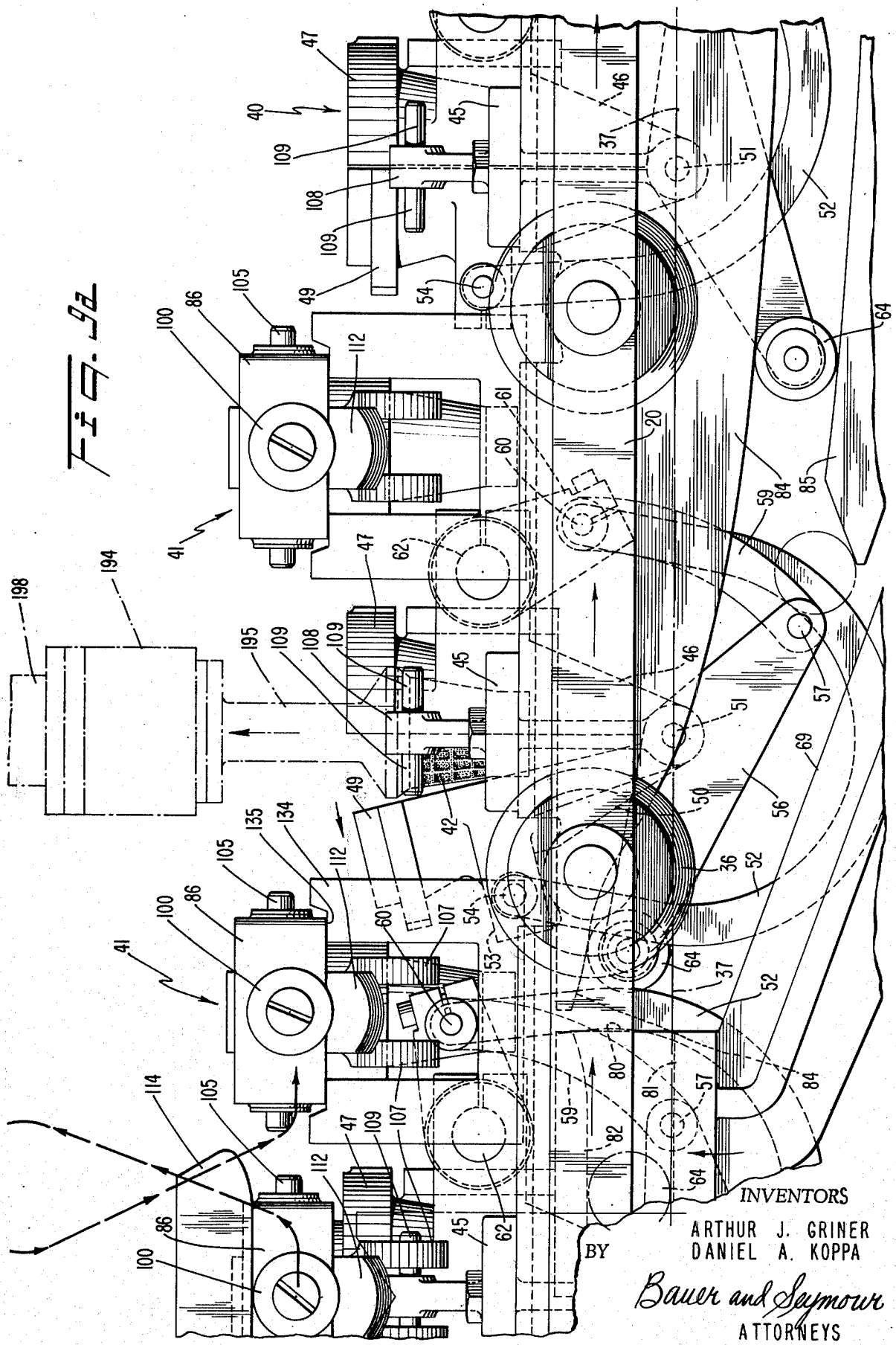

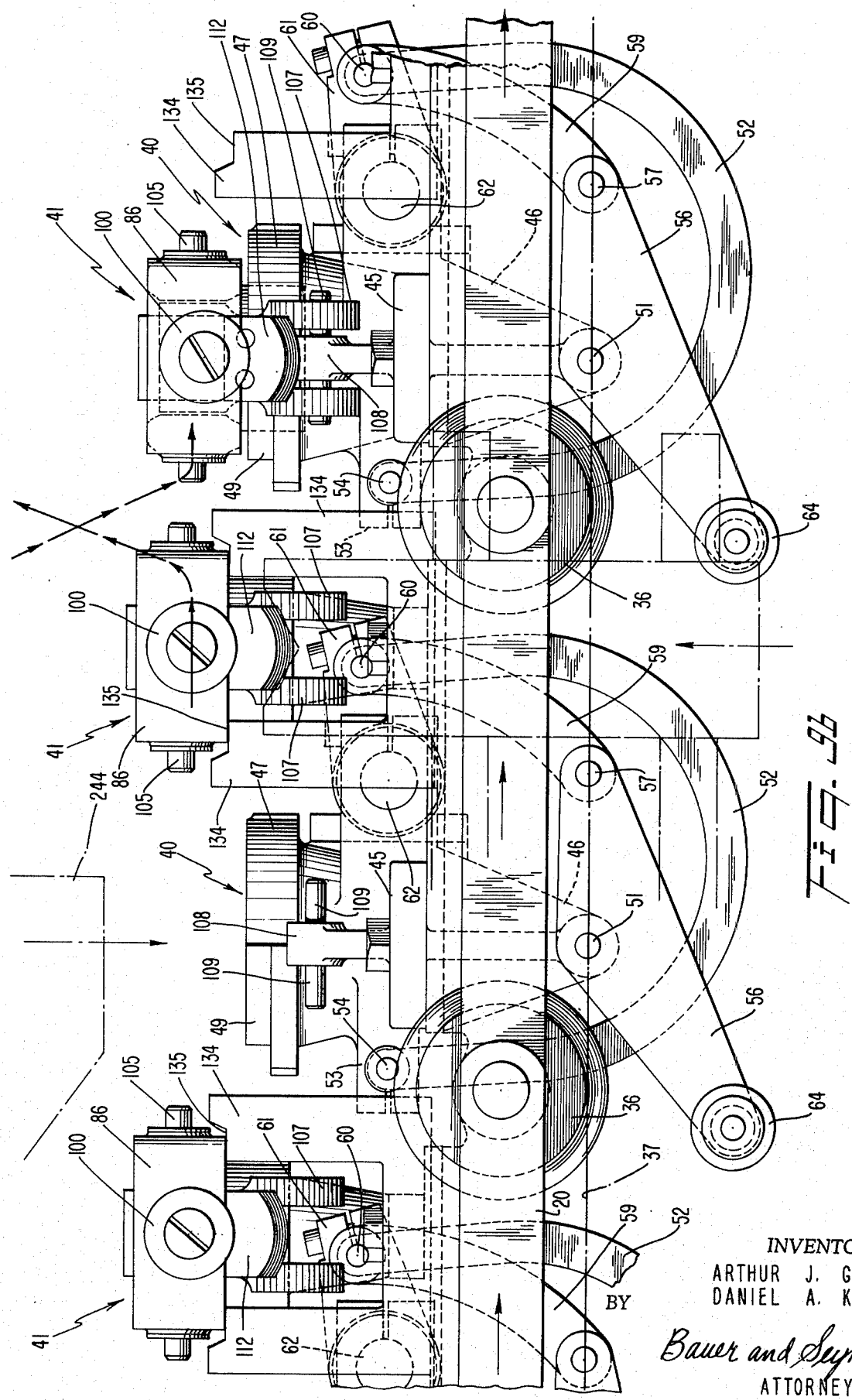

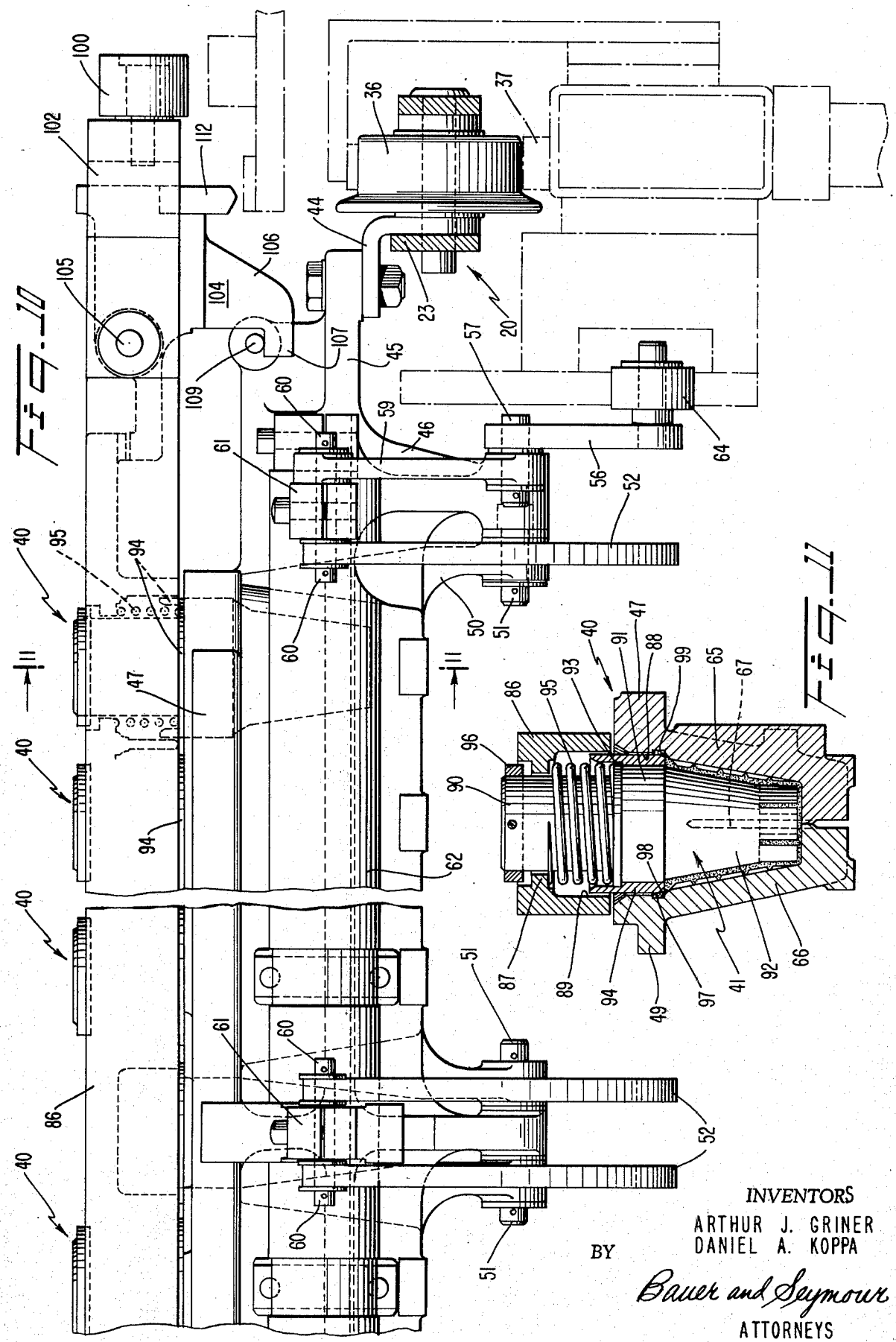

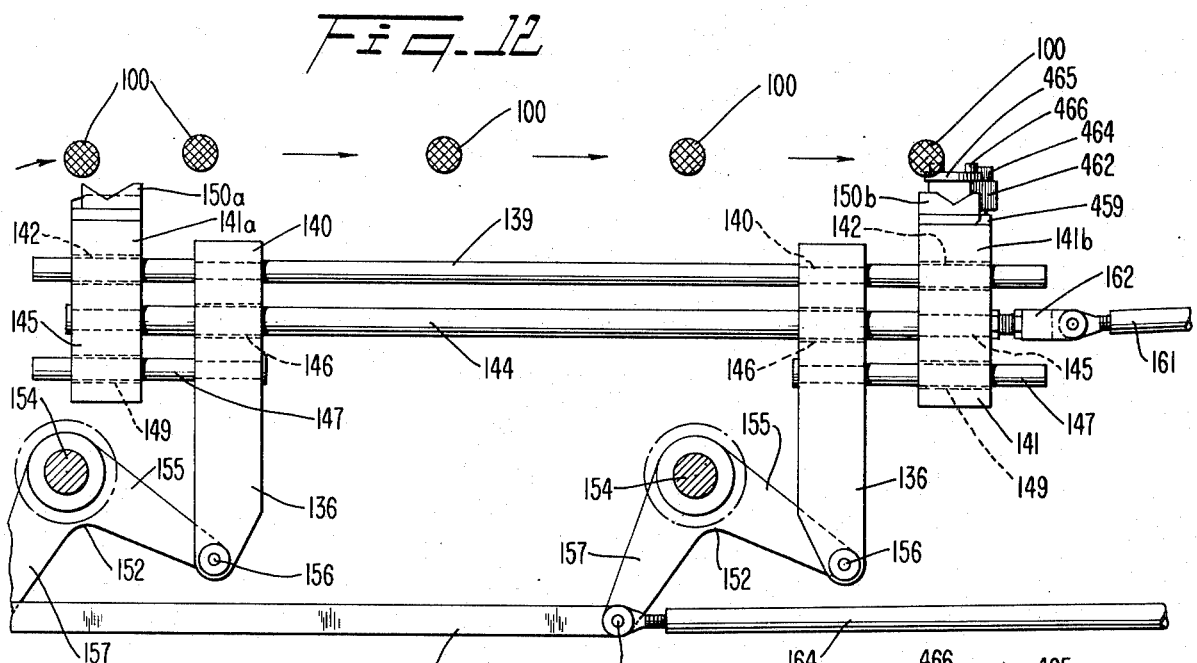
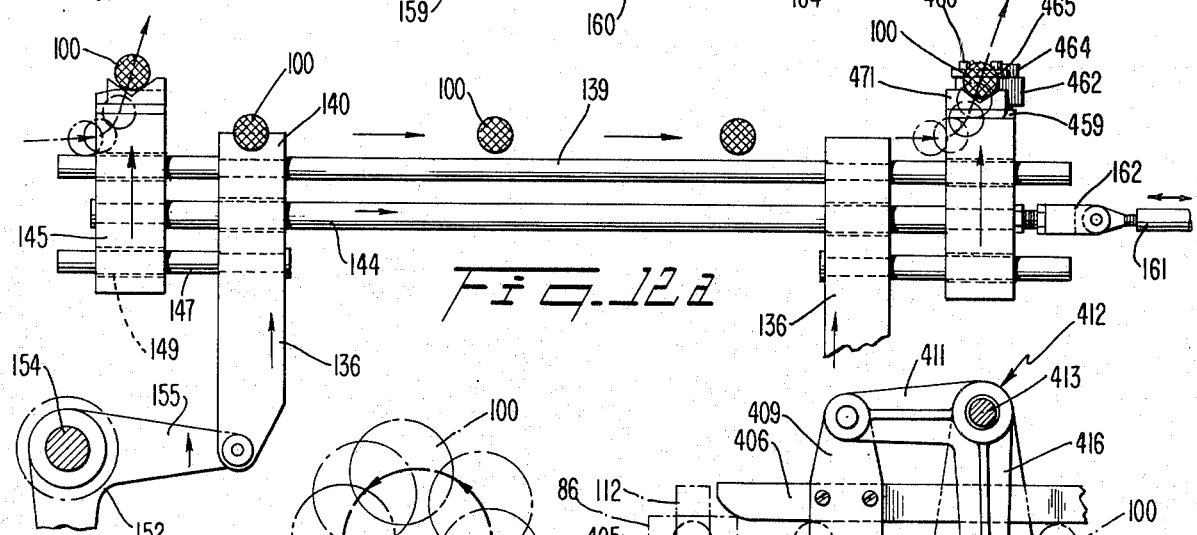
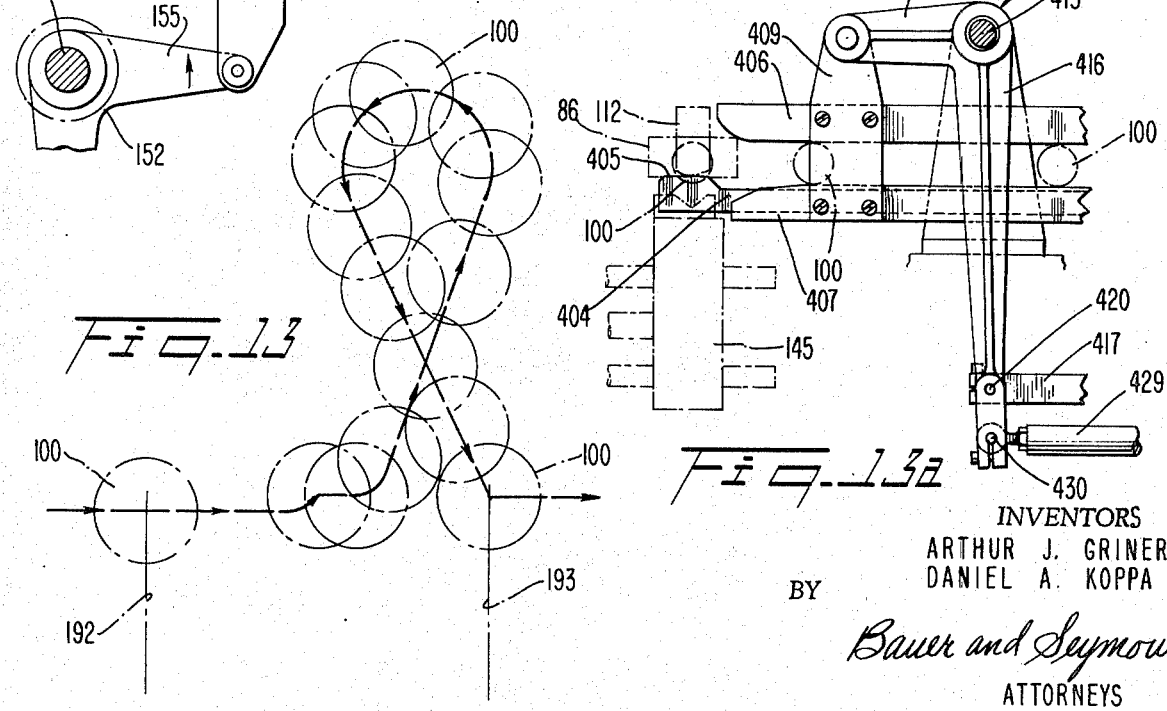

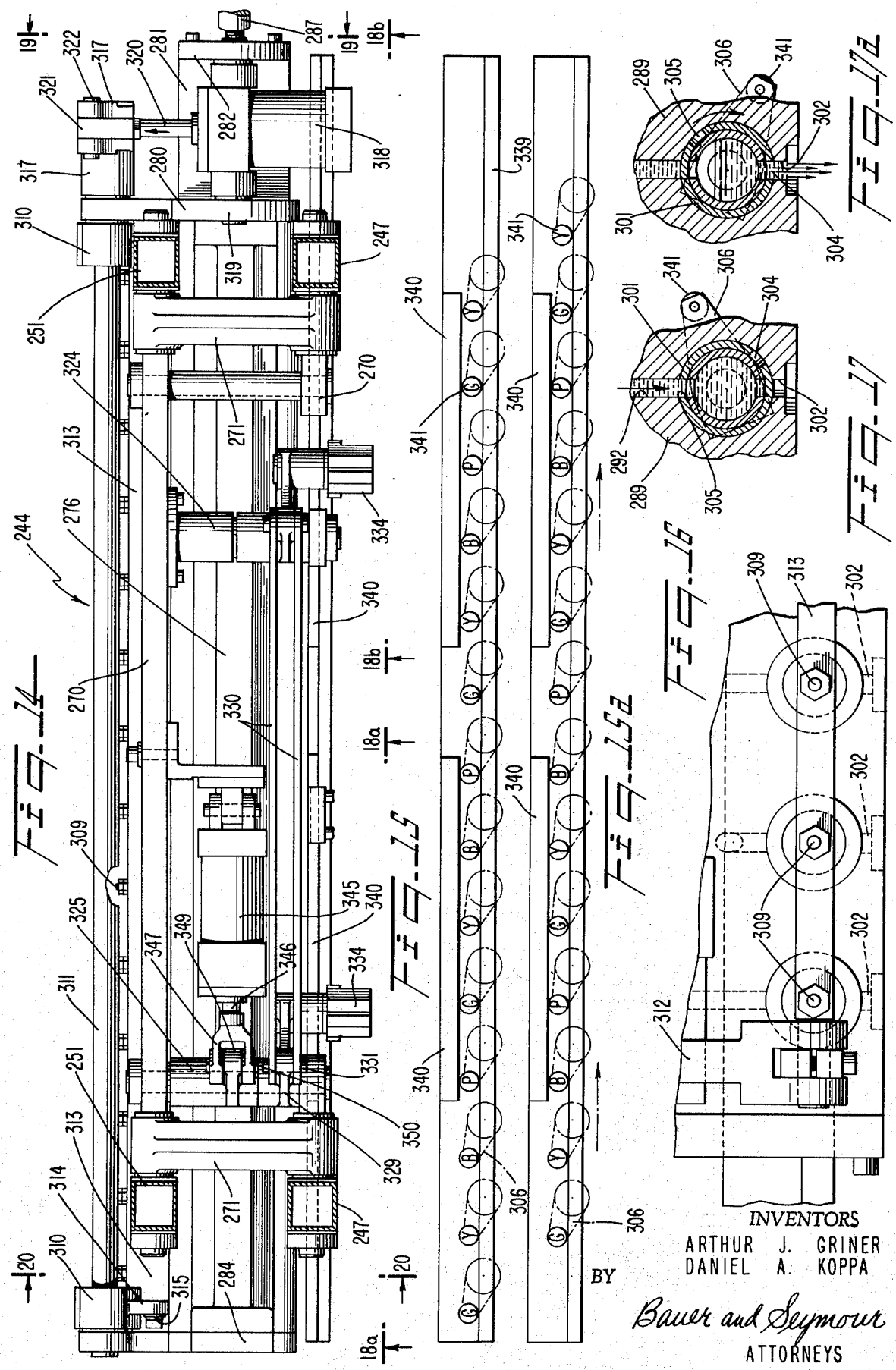

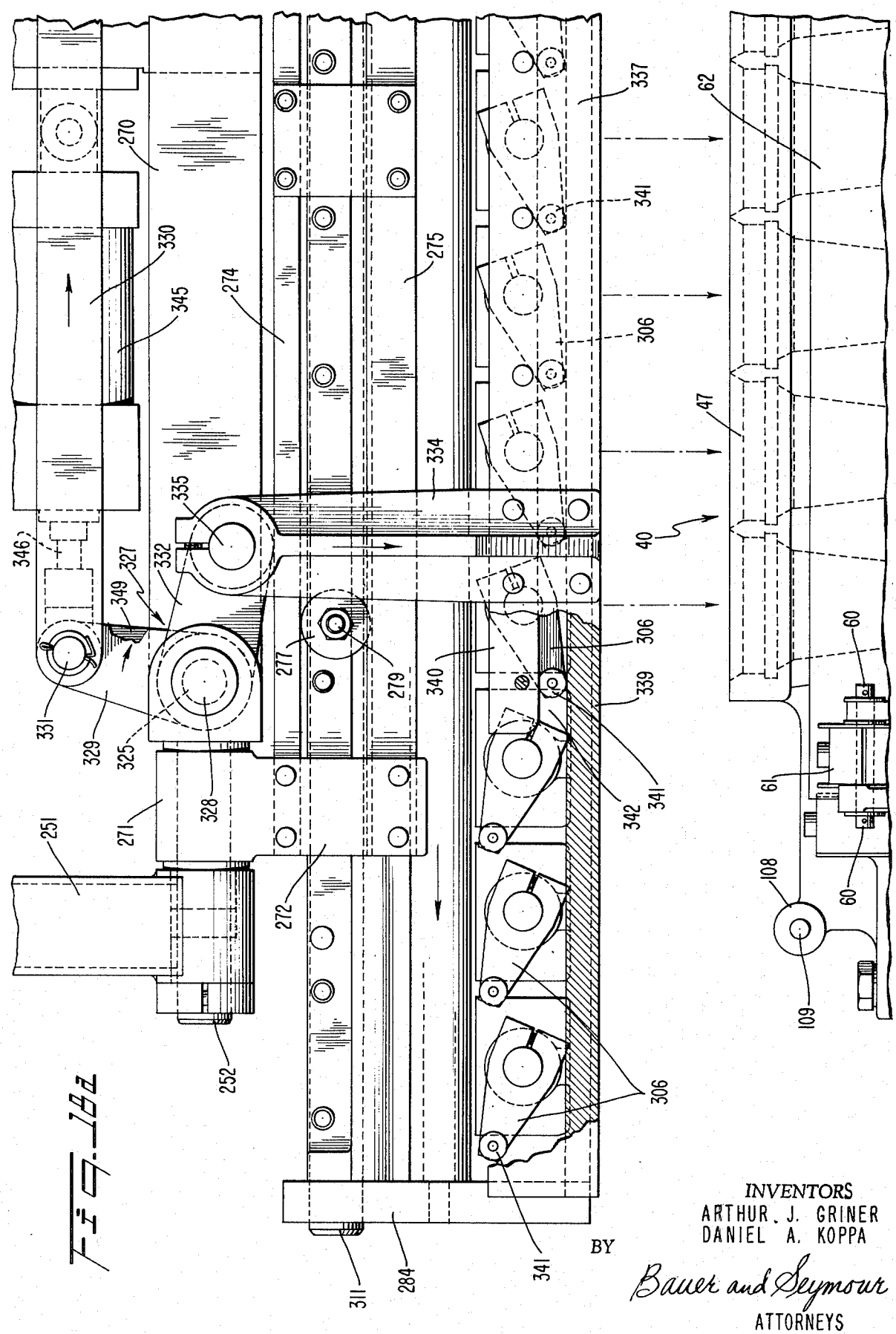

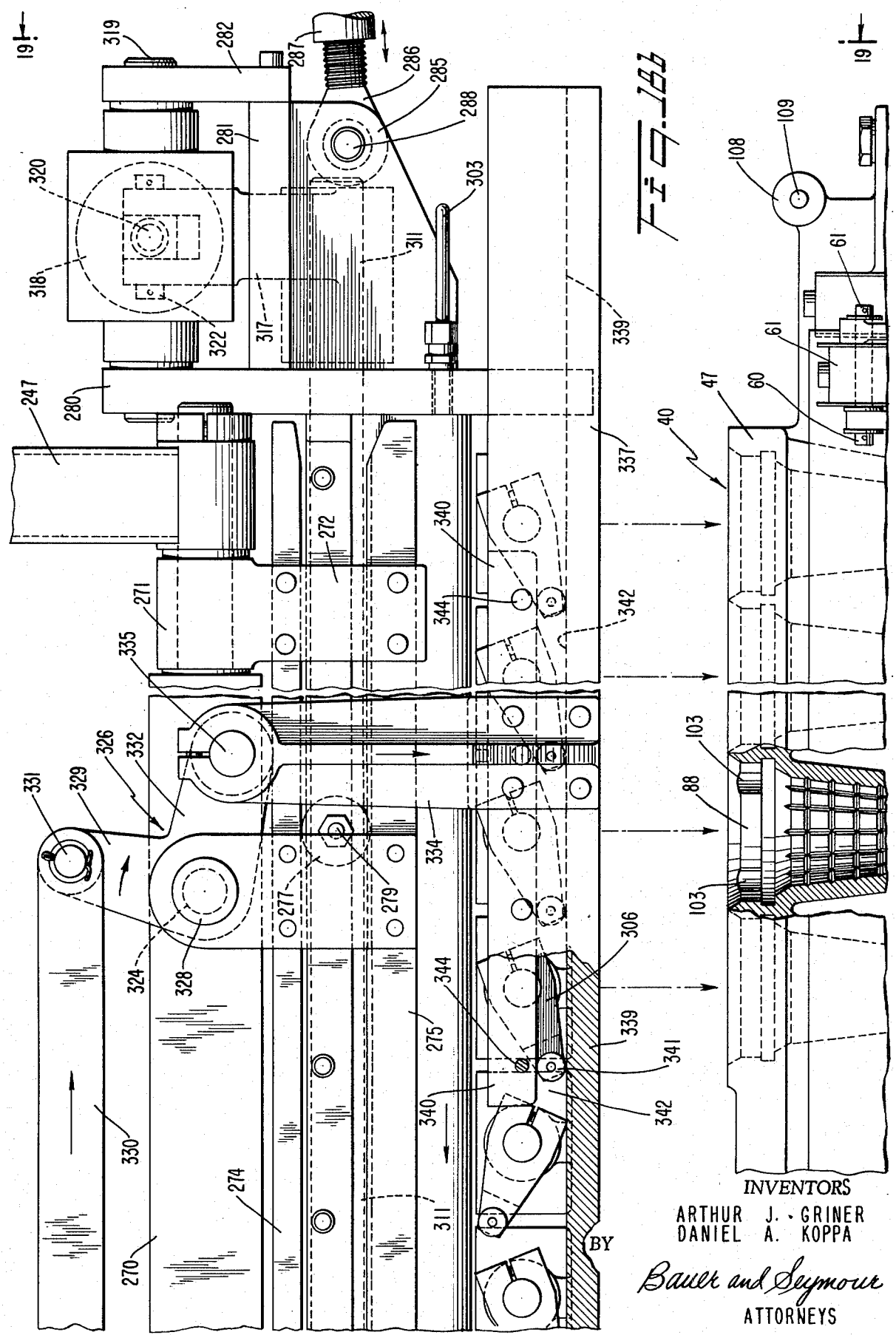

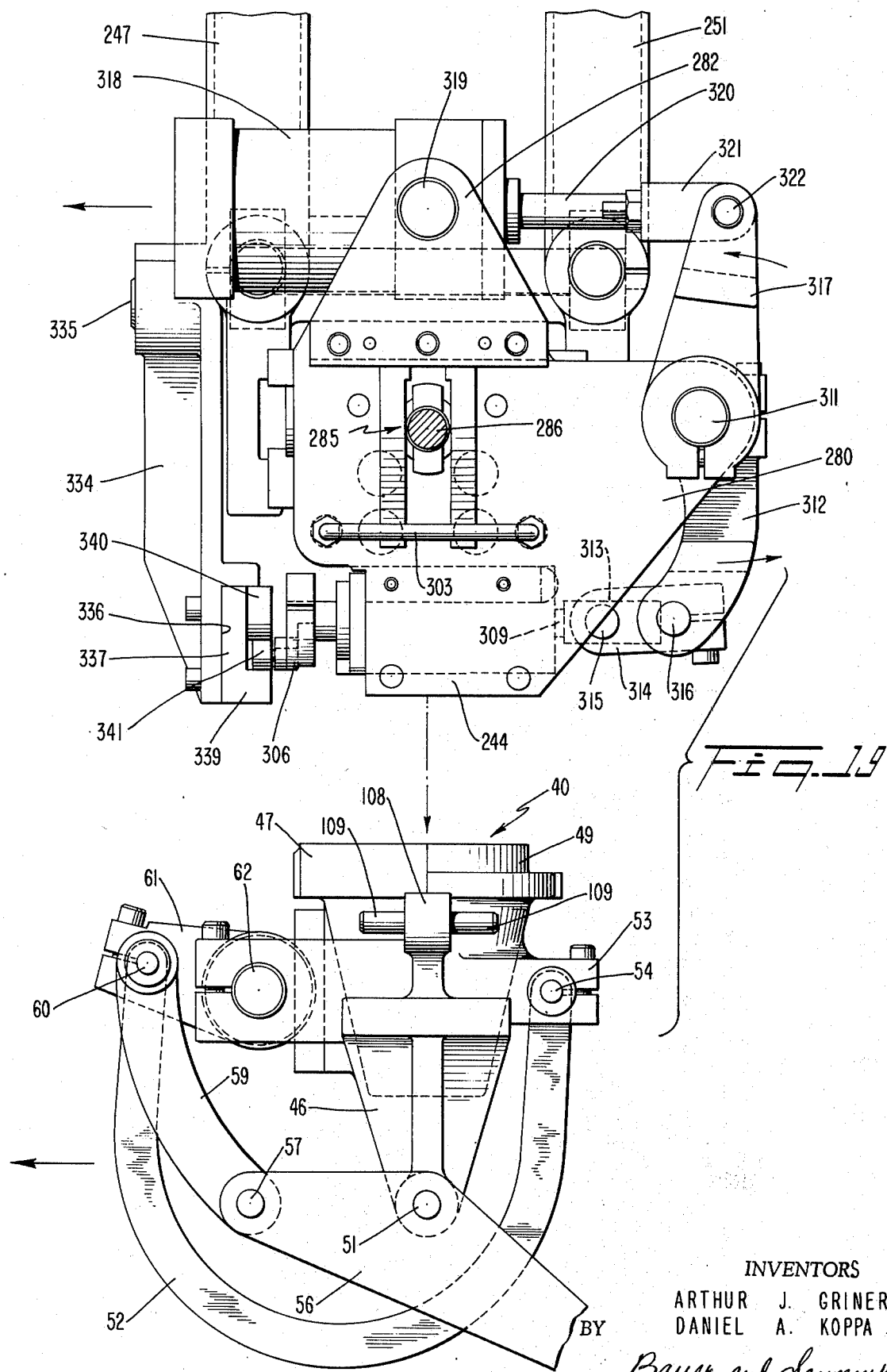

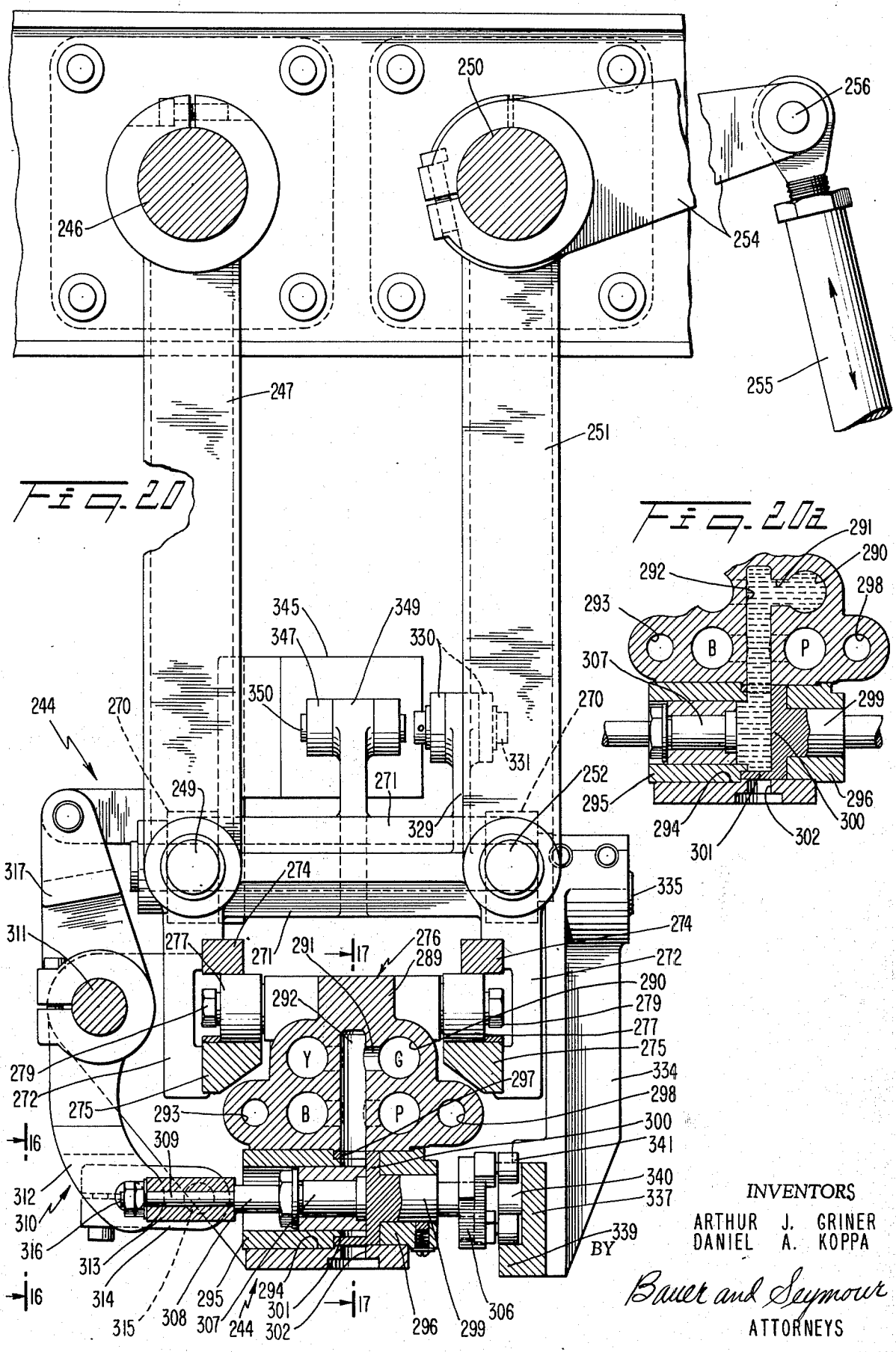

INVENTORS
ARTHUR J. GRINER
DANIEL A. KOPPA
BY
Bauer and Seymour
ATTORNEYS

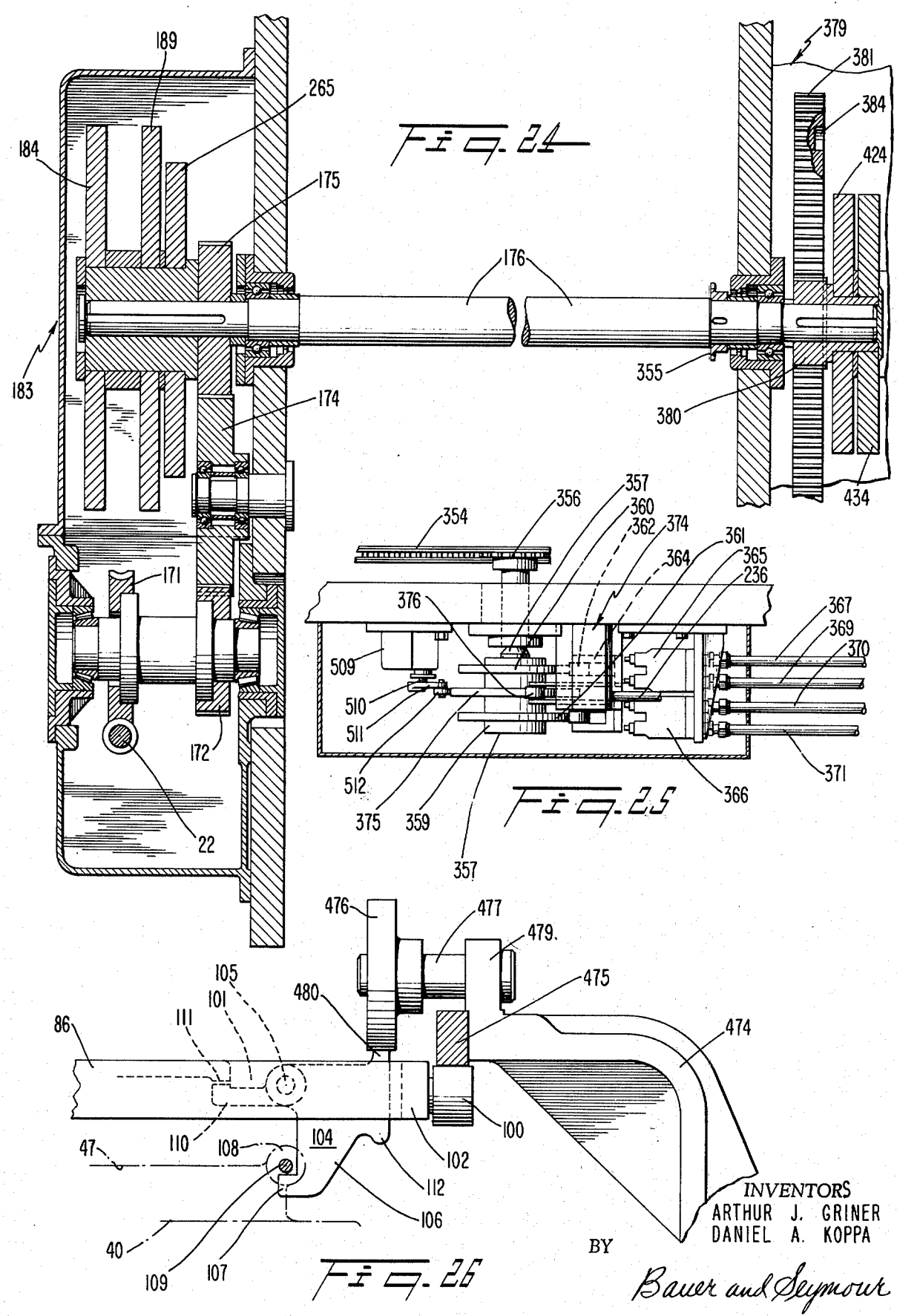

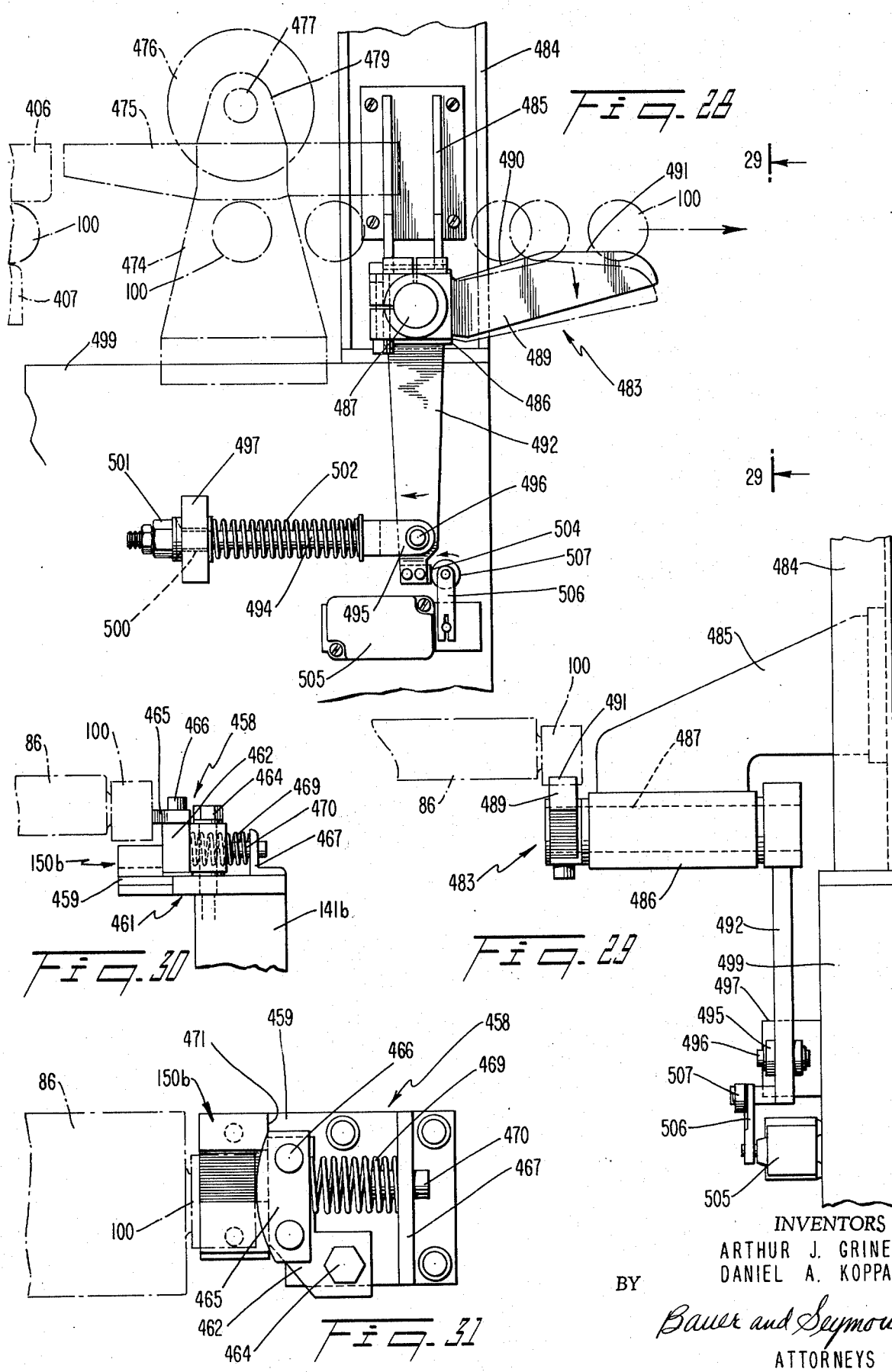

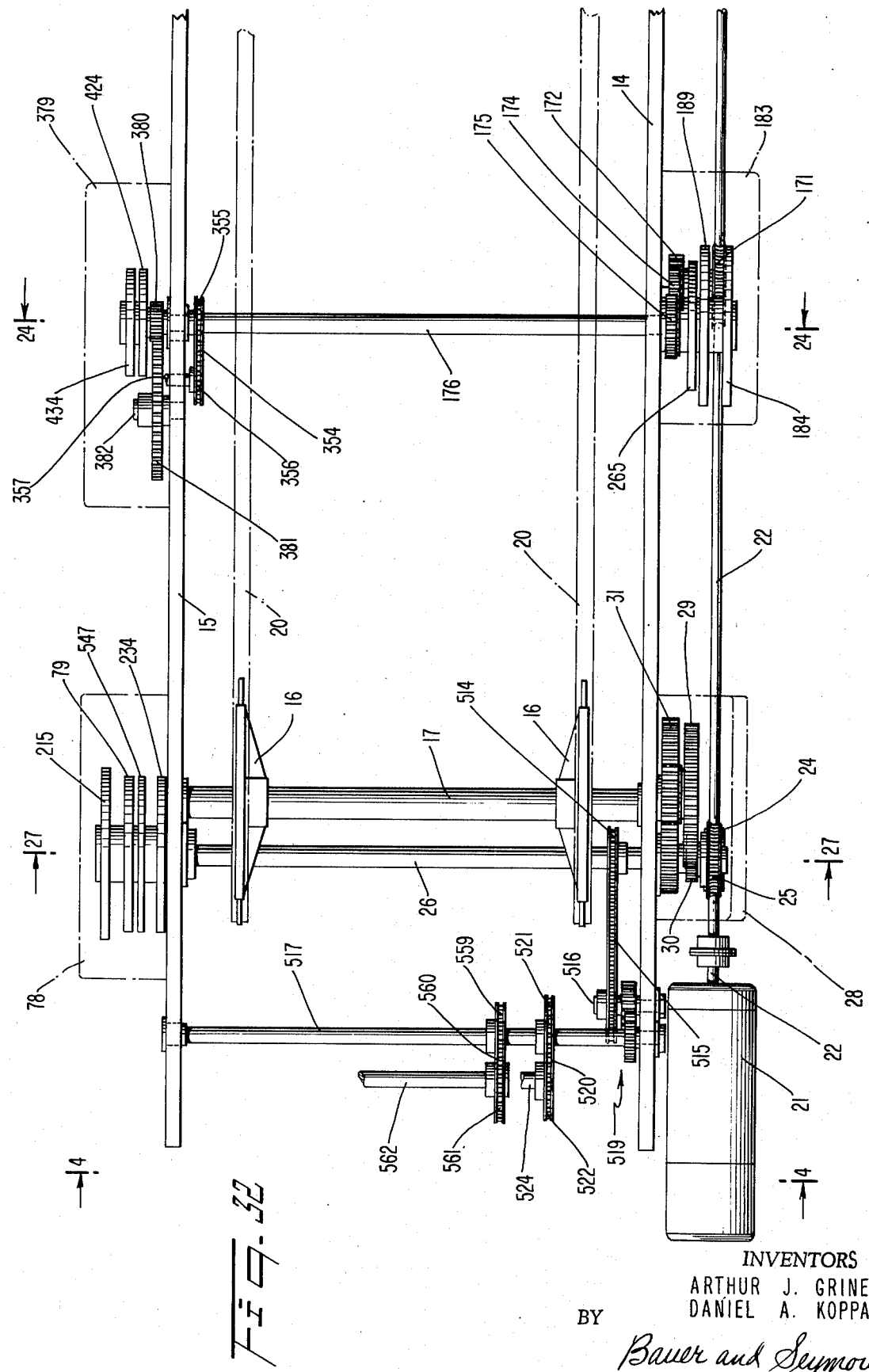

APPARATUS FOR AND METHOD OF MAKING PASTRY CUPS AND THE LIKE

This invention relates to an apparatus for and a method of making products such as pastry cups or cones by baking batter in molds provided with removable cores.

Prior apparatus for producing these and similar products have been slow in operation; core removal, storage, and replacement have required cumbersome, bulky mechanism which was also defective in that it did not center the cores accurately in the mold cavities upon their replacement therein. As a result, the products had sidewalls which were frequently porous and/or markedly non-uniform in thickness, and the number of rejects and the amount of wastage generally were high.

The apparatus of the invention overcomes the above indicated disadvantages of the prior art by the provision of an improved apparatus of the type wherein molds are carried by a conveyor through successive stations. The improvements in the general organization of the apparatus, and of the various individual units or parts thereof, will appear from the following description of an illustrative preferred embodiment of the apparatus.

The invention has among its objects the provision, in an endless chain type of pastry baking apparatus provided with molds and cores removable therefrom, of an improved core transferring and storing mechanism.

Another object of the invention is the provision of split molds having novel mold opening, closing, and locking means.

A further object is the provision of cores and core bars mounting the cores in a novel manner, and cooperating with the molds in such manner as to permit the selective locking of the core bars to the mold bars mounting the molds, and the unlocking and removal of the core bars therefrom.

Yet other objects of the invention are the provision of means for latching the core bars individually on the mold bars, means for insuring the centering of the cores in the molds before they are latched thereto, and means for detecting the locking of the core bars to the mold bars and for stopping the machine if a core bar should not be properly latched.

Still further objects are the provision of novel core bar unlatching means, novel means for removing the baked product from the opened molds, a novel batter pump novelly placed in the apparatus for charging the molds after they have been closed, and core jogging means operative upon the cores prior to the latching of the core bars to the mold bars to permit the ready escape of steam and air from the molds.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a shortened view in side elevation of an illustrative machine in accordance with the invention, the front or delivery end thereof being at the left and an intermediate portion of the oven or rear end of the machine being broken away;

FIG. 1a is a fragmentary view in side elevation of the front end portion of the machine, the view being taken from the side opposite that shown in FIG. 1;

FIG. 2 is a fragmentary view in vertical longitudinal section at the front end of the apparatus, the view showing the core removal, mold opening, product discharge and flash trimming stations, the sections being taken along the line 2—2 of FIG. 4;

FIG. 3 is a fragmentary view in vertical longitudinal section at the mold charging, core replacement, core jogger and core bar locking stations, the section being taken along the line 3—3 of FIG. 5 and showing an extension toward the right of the apparatus of FIG. 2;

FIG. 4 is a view in front elevation of the apparatus, the section being taken along the line 4—4 of FIG. 1;

FIG. 5 is a vertical transverse section of the apparatus, the section being taken along the lines 5—5 of FIGS. 1 and 1a;

FIG. 6 is a fragmentary view in plan of the apparatus, the view being taken from the right and in the plane of the line 6—6 of FIG. 3;

FIG. 7 is a view in side elevation of the cone or cup produced by the machine;

FIG. 8 is a schematic view showing the manner in which core bars are transferred from travelling molds to travelling storage means which alternate with the molds;

FIG. 9a is a view in side elevation of the upper reach of a conveyor chain, molds, and core bar storage means in generally that portion of the apparatus which is shown in FIG. 2, one of the molds being shown open and the product being about to be discharged therefrom;

FIG. 9b is a view in side elevation similar to FIG. 9a but of a portion of the upper reach of the conveyor shown in FIG. 3 rearwardly or downstream of that shown in FIG. 9a, the view being taken along the line 9b—9b of FIG. 6, FIGS. 9a and 9b taken together showing a continuous portion of the conveyor with molds and core bar storage means of the apparatus;

FIG. 10 is a rear elevation view of one end portion of a mold bar and a core bar assembly mounted on the conveyor chain, the view being taken along the line 10—10 of FIG. 6;

FIG. 11 is a view in vertical axial section through a mated mold and core filled with batter, the core being shown in elevation, the section being taken along the line 11—11 of FIG. 10;

FIG. 12 is an isolated view in side elevation of the core bar lifting and transferring mechanism, the mechanism being shown in its lowered and left-hand or forward terminal position, preparatory to being moved to the right and lifted so as to engage core bar supporting rollers at two stations spaced longitudinally of the machine;

FIG. 12a is a view similar to FIG. 12 but with the core bar lifting and transferring mechanism having been moved somewhat to the right and lifted so as to engage and support two longitudinally spaced core bars;

FIG. 13 is a schematic view showing the motion of a roller mounted on the end of a core bar during the transfer of the core bar from a mold to a storage position or vice versa;

FIG. 13a is a fragmentary isolated view in side elevation of the machine at the entering end of the core bar jogger, the figure also showing the means for maintaining the core bar latching means open or raised as the core bar passes through the jogger;

FIG. 14 is a view in plan of a multi-unit pump for metering batter to the mold cavities;

FIG. 15 is a schematic view in side elevation of the pump valve operating mechanism, as viewed from the bottom of FIG. 14, with the pump in a first transversely indexed position and the metering valves in closed position;

FIG. 15a is a view similar to FIG. 15 but with the pump indexed one position to the right;

FIG. 16 is a fragmentary view in side elevation of the lower, piston side of the pump, the view being taken from the line 16—16 of FIG. 20;

FIG. 17 is a fragmentary view in vertical section of the pump, the section being taken through a metering valve along the line 17—17 of FIG. 20, the valve being shown in position to close the dispensing orifice and open the inlet orifice;

FIG. 17a is a view similar to FIG. 17 but with the valve in open or dispensing position;

Figure 21:
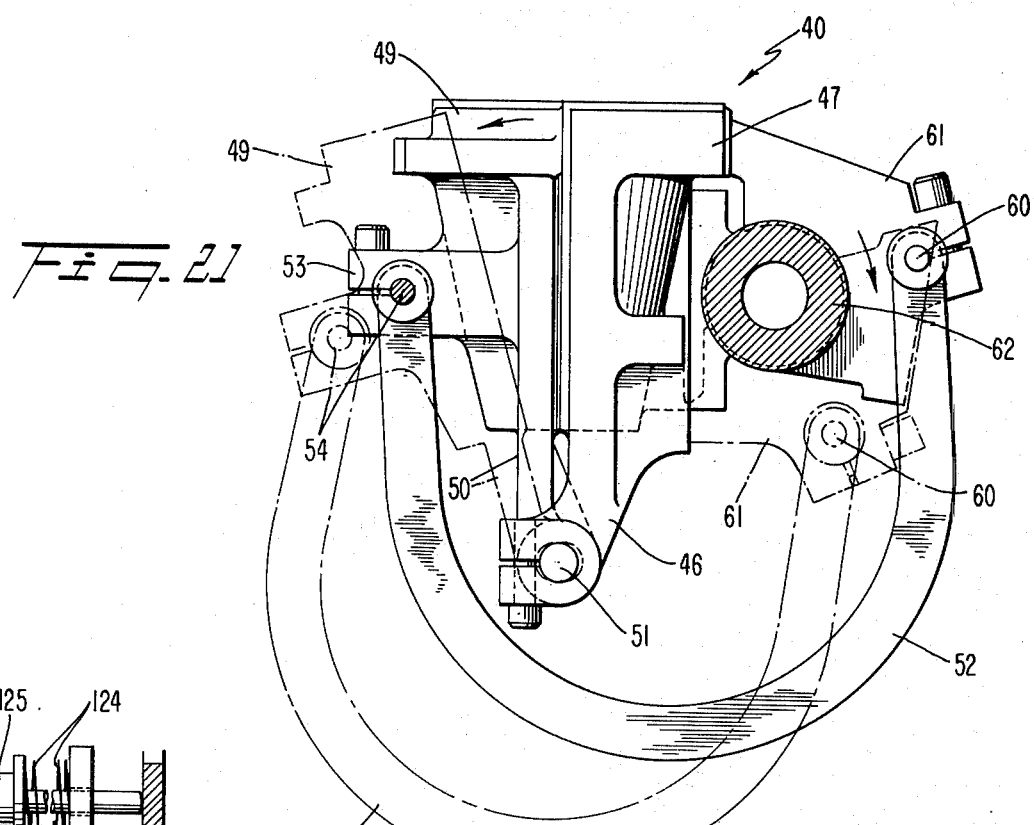
Figure 22:
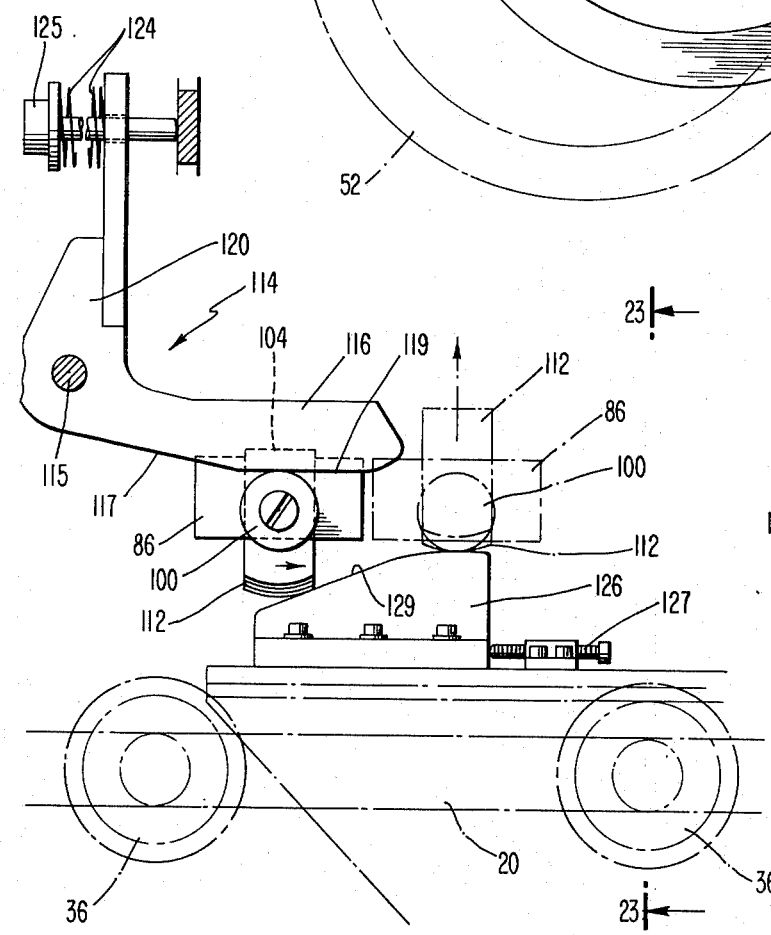
Figure 23:
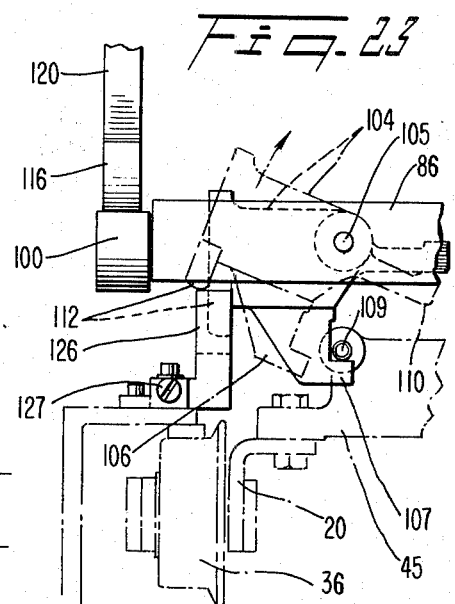
Figure 27:
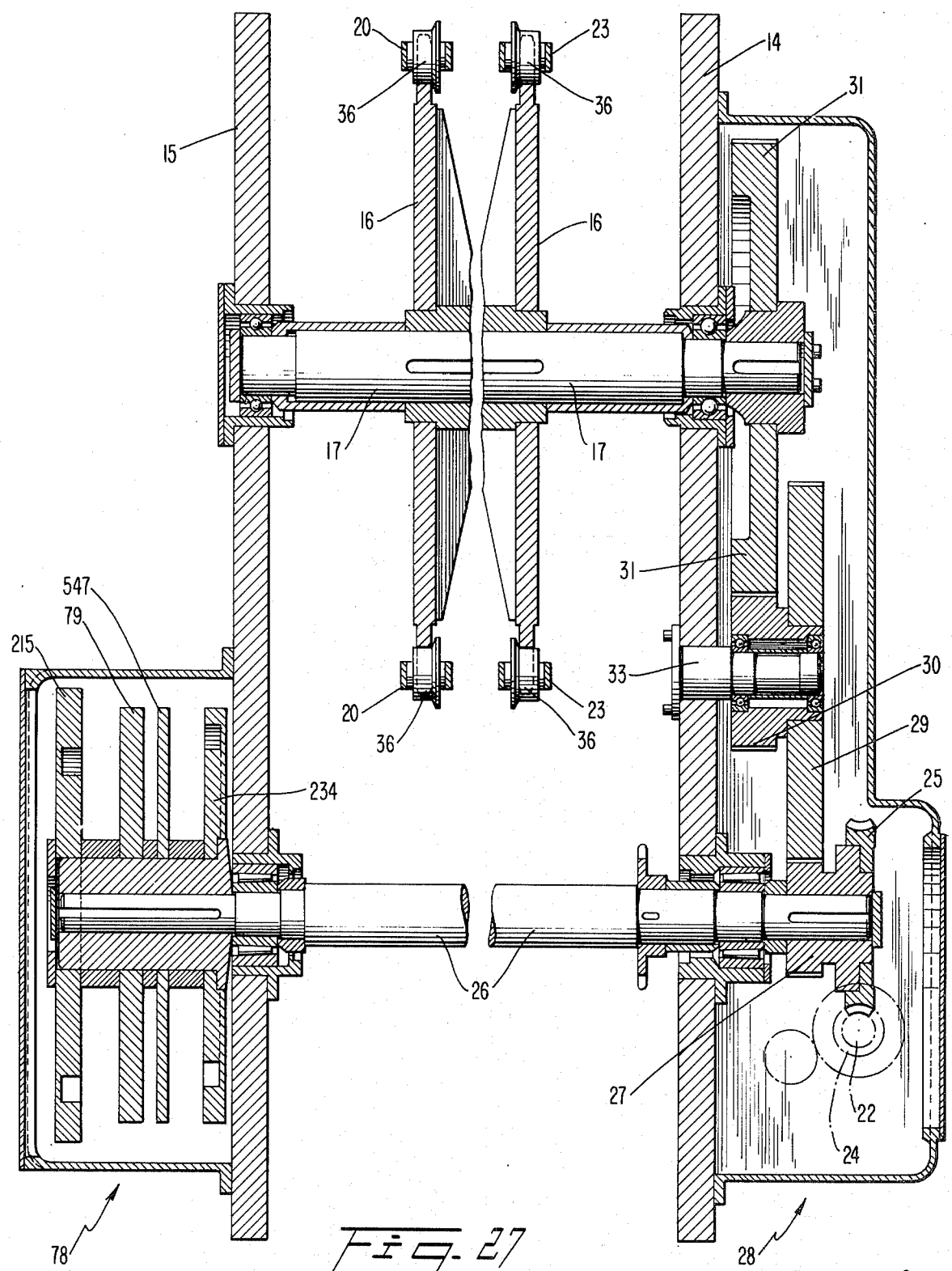

FIG. 18a is a view in side elevation at the left-hand end of the pump and a mold bar as viewed from the right in FIGS. 1 and 20, the view being taken along the line 18a—18a of FIGS. 3 and 14 with the pump indexed into its left-hand position as in FIG. 15, and the valve operating mechanism lowered into valve-opening position;

FIG. 18b is a view similar to FIG. 18a with a portion broken away, of the other or right-hand end of the pump and a mold bar, the view being taken along the line 18b—18b of FIG. 14;

FIG. 19 is a view in elevation of the pump and a mold bar assembly as viewed in FIG. 2, the view being taken from the line 19—19 of FIGS. 14 and 18b;

FIG. 20 is a view in transverse vertical section through the pump, the section being taken along the line 20—20 of FIG. 14, a pump piston there shown being at the end of a batter-dispensing stroke, the valve associated with such piston being shown in closed position;

FIG. 20a is a fragmentary view showing the pump piston of FIG. 20 at the end of a suction stroke, the valve dispensing orifice being closed;

FIG. 21 is a view partially in elevation and partially in vertical section through a mold bar assembly, the parts being shown in solid lines in mold closed position and in phantom lines in mold open position, the section being taken along the line 21—21 of FIG. 6;

FIG. 22 is a fragmentary view in side elevation of the core bar unlatching mechanism, the mechanism being shown in solid lines about to be operated, the core bar latching dog on the latching member being shown in phantom lines elevated into its unlatched position;

FIG. 23 is a view in elevation of the core bar unlatching mechanism, the view being taken from the line 23—23 of FIG. 22, the latching member being shown in solid lines in its latching position and in phantom lines in its inoperative position;

FIG. 24 is a fragmentary view in vertical section through the second and third cam cases, the section being taken along the line 24—24 of FIGS. 1, 1a and 32;

FIG. 25 is a fragmentary isolated view in plan of the air cylinder controlling valves for the pump, for the air discharge of the cones, and for the latch bar lock detecting mechanism, the view being taken from the line 25—25 of FIG. 1a;

FIG. 26 is a view in transverse vertical section through the core bar latching mechanism, the section being taken on the line 26—26 of FIG. 1;

FIG. 27 is a view in vertical transverse section, with parts broken away, through the first gear and first cam cases, the section being taken along the line 27—27 of FIGS. 1 and 1a;

FIG. 28 is an isolated fragmentary view in side elevation of the core bar lock failure detecting means;

FIG. 29 is an isolated fragmentary view in end elevation of the core bar lock failure detecting means, as viewed from the right in FIG. 28;

FIG. 30 is an isolated view in end elevation of the core bar centering means, the view being taken from the front of the machine and with the core bar travelling away from the reader;

FIG. 31 is a view in plan of the core bar centering means of FIG. 30; and

FIG. 32 is a fragmentary view in plan of the driving mechanism at the forward end of the apparatus, such mechanism including the first gear case, the first cam case, the combined second gear and cam case, and the third cam case.

The illustrative machine has a mold filling section 10, and oven 11, and a conveyor 12 disposed in front of the section 10 for receiving baked and trimmed cones discharged from the section 10. The section 10 has two laterally spaced vertical plate-like frame members 14 and 15, the member nearer the reader in FIG. 1 being designated 14. Laterally spaced conveyor sprockets 16 are affixed to a horizontal cross shaft 17 which is journalled in the frame members 14 and 15 as shown in FIG. 27. Similar sprockets 19 are affixed to a shaft 18 journalled in frame structure at the rear end of the oven. Two similar conveyor chains 20 each having laterally spaced links 23 are entrained over the sprockets 16 and 19 as shown in FIG. 1. The sprockets 16 and 19 are driven by a motor 21, the motor shaft being connected by a flexible coupling to an aligned longitudinally extending drive shaft 22 to which a worm 24 (FIGS. 27 and 32) is affixed. Worm 24 meshes with a worm wheel 25 which is affixed to that end of a cross shaft 26 which is disposed outwardly of the frame member 14. A pinion 27 keyed to shaft 26 meshes with an idler gear 29 journalled on a fixed stub shaft 33, a pinion 30 affixed to gear 29 meshing with a larger gear 31 which is affixed to the shaft 17 carrying the sprockets 16. The sprockets 19 at the rear end of the machine are driven by the shaft 22 through the medium of a gear box 32, a sprocket on the output shaft of the gear box being connected by a chain 34 to a sprocket 35 secured to the shaft 18 carrying the conveyor sprockets 19, as shown in FIG. 1.

The chains 20 are provided with supporting rollers 36, such rollers being journalled on stub shafts which connect successive links 23 of the chain together. Upper horizontal tracks 37 (FIG. 10) and lower horizontal tracks 39 (FIG. 5) disposed within and extending forwardly from the oven support the respective upper and lower runs of said chains. Mounted upon the chains 20 on transversely disposed mold bar assemblies 45, to be described, are a plurality of molds 40, there being two transversely aligned sets, each containing five molds, in each of the mold bar assemblies in the embodiment shown. Transversely disposed core bars 86 carry cores 41 for cooperation with the molds 40. As will be seen hereinafter, the core bars are disposed in mating cooperating relationship with the mold bar assemblies throughout the entire length of the chains 20 with the exception of a relatively short portion of section 10 of the machine in which the core bars are removed from the mold bar assemblies and temporarily stored to permit the removal of the baked cones from the molds and the filling of the molds prior to the reinsertion of cores therein before the re-entry of the assembled molds and cores into the oven. The product produced by the illustrative apparatus is a frusto-conical or flat bottomed cone or cup which is shown at 42 in FIG. 7.

The Mold Structure

As shown in FIG. 10, right angled brackets 44 are affixed to the chains 20, the vertical flange of each bracket being disposed outwardly of the inner link 23 of the chain, and the other flange of the bracket being disposed horizontally and extending laterally inwardly. Mold bar assemblies 45, which extend transversely of the machine between the spaced chains 20, are provided with ears 43 at their opposite ends, such ears being bolted to the horizontal flanges of the brackets 44. The molds 40 of each mold bar assembly are split vertically along their transverse central planes, being formed of ten semi-frusto-conical cavities in a fixed body portion 43, 47 and confronting semi-frusto-conical cavities in two pivoted body portions 49, each having five such cavities (FIGS. 19 and 21). The leading mold bar portion 47 and the trailing mold bar portions 49 are pivotally connected by depending ears 46 at the ends and center of fixed portion 47, cooperating depending ears 50 on the ends of mold parts 49, and horizontal stub shafts 51 through the sets of ears 46 and 50 adjacent their lower ends. The mold parts 47, 49 are forcibly held together, so that the mold cavities are substantially liquid-tight, by stiff arcuate springs 52 (four shown) which are disposed in vertical planes longitudinally of the machine. One set of ears 46, 50 and a spring 52 are disposed at each end of the mold bar 47, 49, and one set of ears 46, 50 and two springs 52, one at each side of the last set of ears, are disposed centrally of the machine between the two transversely aligned sets of five molds each formed by the mold parts 47, 49.

The trailing end of each of the springs 52 is pivotally connected by a pin 54 to a projection 53 extending from the trailing edges of the movable mold bar portions 49. A first-class lever 56 at each end of a mold bar assembly 47, 49 is pivoted intermediate its length on a stub shaft 51 which pivotally connects the fixed and movable mold bar parts 47, 49 together at their lower ends. The leading ends of the levers 56 are pivotally connected at 57 to curved links 59, the forward end of each of such links and springs 52 being pivotally connected at 60 to the outer free ends of arms 61 which are secured to and extend radially from the center and each end of a shaft 62 pivotally mounted at its ends in mold bar portion 43, 47.

The springs 52, the links 59, levers 56 and the lever arms 61 are so constructed and arranged that when the mold bar parts 47 and 49 are together and the molds are thus closed as shown in FIG. 9b, the arms 61 are inclined somewhat upwardly from the axis of pivot shaft 62. The springs 52 and the lever arms 61 in effect constitute a toggle which is in over-center position when the molds are closed, the ends of each spring 52 then being spread and hence under tension so that the springs strongly urge the mold parts 47 and 49 together. In the illustrative machine, each spring 52 is somewhat more relaxed with the ends thereof closer together when the molds are open as seen in phantom in FIGS. 9a and 21.

The portions of the mold bars 47, 49 which form the opposed halves of an individual mold are designated 65 and 66 in FIG. 11. Such mold halves meet along side and bottom edges 67. Such engaging edges 67 are preferably made relatively thin as shown, whereby to increase the unit pressure imposed thereon by the springs 52 to insure a good seal between the closed mold halves. Also, the mold halves in each group or row of five are so made that when they are closed, the walls of the mold at the middle of the row engage each other first and hence somewhat more forcibly than the walls of the other molds, whereby to pre-stress the walls of the middle mold and to prevent leakage of all of the molds when the same are subjected to heat.

The ends of the trailing arms of the levers 56 are provided with rollers 64 which engage cam tracks, to be described, whereby to swing the levers 56 clockwise (FIG. 9b) so as to open the molds at the location in section 10 of the machine wherein the baked cones are to be removed from the molds. When the molds are thus opened, as shown centrally in FIG. 9a, the effective diameter of the springs 52 between pivots 54 and 60 is decreased, and the tension thereof is diminished.

The Mold Opening and Closing Mechanism

The respective rollers 64 on the levers 56 at each end of the travelling mold bar assemblies are sequentially received within an open-ended cam "box" 80 adjacent each side of the machine (FIGS. 2 and 9a). Each cam box or track 80 has lower and upper surfaces 81 and 82. The tracks 80 are formed in the outer free ends of two similar laterally spaced levers 69 which are fixedly secured to a transverse rock shaft 70 journalled in the side frame members 14 and 15 of the machine. A lever arm 71 (FIG. 2) affixed to the rock shaft 70 is pivotally connected to a vertical link 72, the lower end of which is pivotally connected at 74 to the end of a substantially horizontal arm of a bell crank lever 75 mounted on a cross shaft 76. A cam follower roll 77 is journalled on the lower end of the second, substantially vertical arm of the bell crank 75. Such cam follower rides upon the surface of a suitable cam 79 (FIG. 27) which is fixed to the cross shaft 26 within the cam case 78. The cam 79 is of such configuration that after the rollers 64 have entered the tracks 80 the lever arms 69 are pivoted clockwise (FIG. 2) so as to lift said tracks and swing the levers 56 clockwise and thus open the molds of that particular mold bar assembly which is approaching the product discharge station. After the rollers 64 have passed through the raised cam tracks 80, the same are moved down by the linkage 69, 71, 72, 75 and cam 79 or by resilient means to be in position to receive the rollers 64 on the next mold bar assembly. The molds in the opened set thereof are maintained stably open until after the baked cones have been removed therefrom, following which the levers 56 are forcibly swung counterclockwise (FIGS. 2 and 9a) to close the molds in readiness for their being charged with batter. The closing of the molds is effected as follows. The followers 64, travelling with the molds, are received beneath stationary upper cam tracks 84. Cam tracks 84 gradually rotate the levers 56 counterclockwise as the molds travel to the right (FIG. 9a). As the levers 56 approach their terminal, mold-closed position, the rollers 64 enter slightly inclined tracks between cams 84 and lower fixed cams 85. The rollers 64 are now trapped between the stationary cams 84, 85 and are gradually brought into their final, mold-closed position (FIG. 9b).

The Core Bar Structure

As shown in FIGS. 6 and 11, there are provided core bars 86 which are disposed transversely of the length of the machine. In the illustrative embodiment the core bars have openings therethrough which receive ten cores 41 in two aligned spaced sets of five cores each at each end of the bar. Each of the openings through the bar 86 through which the upper end of the cores 41 protrude is provided with a radially inwardly extending annular flange 87, the opening in the core bar beneath such flange being somewhat enlarged at 89. Each core 41 has an upper smaller circular cylindrical portion 90 which is joined to an intermediate larger diametered circular cylindrical portion 91 by a transverse annular shoulder 93. A short sleeve 94 is affixed to the core coaxially thereof as by being heat shrunk on portion 91 of the core. Beneath portion 91 the core 41 has a frusto-conical portion 92 which shapes the inner surface of the cone. The outer surface of sleeve 94 accurately engages the confronting annular internal surface 88 of the closed mold.

A coil compression spring 95 is disposed between the flange 87 and a washer on the shoulder 93 whereby forcibly to maintain the core in the downward position thereof shown in FIG. 11 wherein the shoulder 98 formed by the lower outer corner on the sleeve 94 engages an annular shoulder 99 on the mold halves. In such position the lower surface of core bar 86 is spaced somewhat from the upper edge surface of the closed mold. A ring 96 pinned to the cylindrical upper end portion 90 of the core retains the core in the core bar 86 despite the lifting of the latter. The mold halves are provided with a shallow annular groove 97 which receives excess batter which is extruded upwardly from the mold as the core 41 is inserted fully therewithin. The annular surface 88 of the mold is provided with a plurality (four employed) of arcuate channels 103 which receive any excess batter from groove 97 to form ears integral with a rim on the cone formed in groove 97. The rim and ears are later removed from the baked cone by cone trimming means, to be described. The core bars 86 are provided with rollers 100 at their opposite ends, the core bars being lifted from and reinserted in the mold cavities by means to be described, which engage the rollers 100.

The construction of the mold and core and their manner of interaction are such that the cores are erected and accurately centered upon each insertion of the cores into the molds. The upper circular cylindrical part 90 of each core fits loosely within the passage through its flange 87 on the core bar 86. This permits the core 41 to tip in all directions through an appreciable angle with respect to the core bar 86, and also to move an appreciable distance both laterally and longitudinally in the plane of the core bar. Upon the insertion of a core into its mold, the annular transverse shoulders 98 and 99, on the core and mold, respectively, are yieldingly brought into engagement by the spring 95, thereby "erecting" the core; that is, bringing its axis into coincidence with the axis of the mold cavity. The circular cylindrical outer surface of the sleeve 94 engages the annular surface 88 above the mold cavity proper with considerable accuracy, therefore not only aiding the shoulders 98, 99 in erecting the core, but also centering the core with respect to the axis of the mold cavity.

The Core Bar Lock

At each end of a core bar 86 there is provided a vertical transversely extending slot 101 (FIG. 26) which is closed at its outer end by a partition 102 integral with the bar. Within the slot 101 there is pivotally mounted a latch 104 which is secured to the bar by a pivot pin 105. The latch 104 has a depending portion 106, the lower end of which carries a laterally inwardly directed bifurcated finger 107 having two similar parts which cooperate with the opposite ends of latch pins 109 mounted on a boss 108 on the mold assembly part 47. When the core bar 86 has been mounted upon a transverse set of molds and has been pressed thereupon so as to compress the springs 95 associated with the cores, the fingers 107 on the latches 104 swing inwardly so that the spaced parts of the finger 107 lie on opposite sides of the boss and below the respective ends of latch pins 109 on the respective ends of the mold bar part 47. The latches 104 are stopped in the locking position in which they fully engage the pins 109 by engagement between stop fingers 110 on the latches and stop lugs 111 on the core bar 86. The laterally outer end of each of the latches 104 is provided with a vertically disposed latch release lug 112 which engages a respective latch release cam, to be described, fixedly mounted on the machine frame.

As the molds containing the baked product, with the cores mounted therein, approach the product discharge station, the core latching means is released preparatory to the removal of the cores from the mold. Two similar core bar depresser means 114 (FIGS. 2, 4, and 22) are mounted on the opposite fixed frames of the machine. Each of means 114 includes a bell crank lever which is pivoted on a fixed stub shaft 115, one arm 116 of the lever extending generally horizontally in the direction of travel of the molds, and the other arm 120 thereof extending generally vertically. The mold entering end of the lower surface of the arm 116 is inclined gradually downwardly and rearwardly, being joined at its rear end to a horizontal surface 119. The bell crank lever 116, 120 is constantly urged in a clockwise direction (FIG. 2) by a coil compression spring 124 which acts between the upper end of the arm 120 and an abutment on the end of a fixed rod, over which the spring 124 is telescoped and which extends rearwardly through an enlarged hole in the upper end of the arm 120 to a fixed part of the frame. The two coil compression springs 124 are of such strength that when the rollers 100 on the opposite ends of a core bar have reached the surfaces 119 of the respective core bar depresser means 114, the bar 86 will have been moved down and the coil compression springs 95 associated with the respective cores will have been compressed sufficiently so that the fingers 107 of the latching means 104 will be disengaged from the latching pins 109 and free to pivot about pin 105.

After the core latching means 104 have been thus released, the same are free to be pivoted upwardly clockwise (FIG. 23) by engagement of the lower ends of the latch release lugs 112 with the upper surfaces 129 of two opposite ramp members 126 which are mounted on fixed portions of the machine frame in the path of the lugs 112. The upper surfaces 129 of the ramps 126 first incline upwardly and rearwardly and then merge through a curved zone with a short horizontal rear portion. When the rollers 100 of the core bar being released from a mold have reached the position thereof shown in phantom lines at the right in FIG. 22, the latch members 104 will have been tipped upwardly into the position shown in phantom lines in FIG. 23 in which the latching finger 107 has been pulled laterally outwardly from beneath the mold bar pin 109. When the latching members are held in such position, the core bar 86 is free for vertical removal from the mold bar assembly.

Core Removal and Storage

Each set of oppositely disposed links forming the chains 20 is provided with a core bar storage means 132 which is secured to bracket 44 in advance of a mold bar assembly connected thereto. Means 132 is in the form of a U-shaped member or cradle 134, the root of said member being secured to a link 23, 44 with the forwardly and rearwardly spaced legs thereof extending upwardly from the link and in alignment therewith. Seats 135 are provided in the upper inner edges of the legs of members 134. Each pair of the opposed laterally spaced cradles 134 provides seats for receiving the opposite ends of a core bar 86 which has been removed from an aligned set of molds in a mold bar assembly disposed immediately in advance of such cradles. Such relationship is shown in FIGS. 6 and 8. The core bars are successively removed from the mold sets and are transferred to the following adjacent storage means 132 by means which are particularly shown in FIGS. 12 and 12a.

On each side of the core removal station there are two longitudinally spaced vertical bars 136, the two forward bars 136 and the two rear bars being respectively transversely aligned. The bars 136 at each side of the machine are secured together in fixed spaced relation by a longitudinally extending tie bar 139 which is clamped to the upper ends of said bars at 140. The forward and rear ends of the tie bar 139 beyond the bars 136 freely extend through a vertically arranged forward core bar lift member 141a and a rear core bar lift member 141b, the passages 142 through the lift members slidably and guidingly receiving the tie rod 139. The forward members 141a and the rear members 141b on opposite sides of the machine are also respectively transversely aligned. A second tie rod 144 disposed parallel to the tie rod 139 is secured at its ends at 145 to the lift members 141a, 141b. Rod 144 is slidably received in passages 146 through the bars 136. Third, short horizontal rods 147 are fixedly secured to the bars 136 and have sliding engagement with the lift members 141a, 141b by means of passages 149 in such members receiving the rods 147. Each of the lift members 141a, 141b is provided with a respective cradle member 150a, 150b on its upper end, each of members 150a, 150b having a broad V-shaped recess therein to receive the rollers 100 and thereby support the core bars 86. It will be apparent that the lift members 141a, 141b and the members 150a, 150b carried thereby move synchronously and instantaneously in the same direction at all times.

The thus described core bar lifting means including the bars 136, the lift members 141a, 141b, the tie rods connecting and guiding them, and the roller receiving members 150a, 150b are periodically lifted in timed relation with conveyor 20 so that the rollers 100 on the opposite ends of one core bar are received within the recesses in the members 150a, as shown at the left in FIG. 12a, and the rollers 100 on another core bar are simultaneously received within the recesses in the members 150b. The core bar lifting members 141a, 141b are so disposed longitudinally of the machine that the members 150a at the left engage the rollers 100 on the core bar 86 immediately in advance of the product discharge station whereas the members 150b at the right engage the rollers 100 on a core bar 86 rearwardly of the station of the machine in which the molds are charged with metered quantities of batter. The lefthand members 141a, 150a lift a core bar 86 from a mold assembly 47, 49 and lower the same onto the oncoming storage cradles 134 to the left of and trailing the mold assembly from which it is removed. At the same time the lift members 141b, 150b at the right (FIG. 12) remove a core bar 86, 100 from a storage station 134 and lower it upon the adjacent oncoming mold bar assembly which has just been provided with batter.

The core transferring means shown in FIGS. 12 and 12a is periodically actuated in a novel manner by the following means. Two longitudinally spaced horizontal transverse rock shafts 154 are journalled at their ends in frame members 14 and 15. Adjacent each end of each shaft 154 inwardly of the side frames there is affixed a lever arm 155, the outer end of which is pivotally connected to the lower end of a respective bar 136 by a pivot pin 156, said arms 155 being parallel. Also affixed to the rock shafts 154 adjacent the frame member 14 are two lever arms 157, the free ends of which are pivotally connected to a tie bar 159 by pivot pins 160. Also pivotally connected to pivot 160 of the forward lever arm 157 is a push rod 164 which is reciprocated by means to be described. The parts 141b, 144 and 141a of the core bar transfer means are reciprocated longitudinally by second push rods 161 on each side of the machine, each rod 161 being pivotally connected as by clevis means which is adjustably secured at 162 to the tie bar 144. Rods 161 and 164 are reciprocated in timed relationship so as to move each of a pair of spaced core bars 86 engaged by the members 150a and 150b in the manner generally illustrated in FIG. 13, to be described hereinafter.

The Drive for the Core Bar Transfer Means

The extension of the drive shaft 22 intermediate its length runs through a gear box 183 adjacent the entering or front end of the oven as shown in FIG. 1. Connected to the drive shaft in gear box 183 is a worm 169 which meshes with a worm wheel 171 affixed to a stub shaft 170 as shown in FIGS. 5 and 24. A pinion shaft 172 on shaft 170 meshes with an intermediate idler gear 174 which in turn drives a gear 175 affixed to a cross shaft 176 journalled in frame plates 14, 15. Fixedly mounted on the lefthand end of the shaft 176 as it is shown in FIG. 24 is a cam 184 which horizontally reciprocates the core bar transfer means shown in FIGS. 12 and 12a in the following manner.

A rock shaft 177 is journalled in the frame members 14 and 15 of the machine. Affixed to the shaft 177 adjacent each end thereof inwardly of the respective side frame member is an arm 179 (FIG. 3) which is connected at its upper end to the respective push rod 161 by a pivot pin 180. As shown in FIG. 1, affixed to the rock shaft 177 at the outer end thereof is a cam follower arm 181 having a cam follower roll 182 on the free end thereof. Roll 182 cooperates with the above-mentioned cam 184 affixed to shaft 176 whereby to rock the shaft 177 and to reciprocate the core bar transfer means shown in FIGS. 12 and 12a horizontally.

On a transverse rock shaft 185 (FIGS. 3 and 5) journalled in frame member 14 there is mounted a cam follower lever arm 186 having a cam follower roll 187 on its outer end. A cam 189 in cam case 183 is affixed to the shaft 176; the cam follower roll 187 rides upon cam 189 to rock the shaft 185 and thus to oscillate an arm 190 affixed to said shaft inwardly of frame member 14 as shown in FIG. 3. The upper end of arm 190 is pivotally connected to the forward end of the push rod 164 by a pivot pin 191; the rear end of the push rod 164 is pivotally connected to the lever arm 157 on rock shafts 154, as we have seen above. The configurations of the cams 184 and 189 are such that the core bar transfer means moves members 150a, 150b and hence the core bars 86, 100 substantially in the manner shown in FIG. 13.

The Motion of the Core Bar Transfer Means

In FIG. 13 there is schematically shown the motion of a core bar supporting roller 100 as the core bar on which it is mounted is transferred from a mold bar assembly 45 after it passes a station 192 to an adjacent trailing core bar storage cradle 134 at a station 193. It must be remembered, in considering FIG. 13, that the conveyor chains 20 and the mold bar assemblies and core bar cradles 134 carried thereby move continuously at a constant speed from left to right in FIGS. 2 and 13. Thus, while a core bar 86 is supported and being moved by the transfer means, the cradle 134 behind or trailing (on chain 20) the mold bar assembly from which the core bar was removed will travel through station 192 to station 193. Substantially the same motion is imparted to a core bar transferred by members 150b from a storage cradle 134 to the adjacent trailing mold bar assembly after the mold cavities thereof have been charged with batter.

The core bar transfer or manipulating means is driven horizontally by cam 184 so as to track or move synchronously with the molds 40 and cradles 134 while the core bar transferring operation is taking place. Vertical motion of the transfer means is imparted thereto by cam 189. After accelerating horizontally from its forward or left-hand terminal position (FIGS. 12 and 13) and moving upwardly, the roller engaging members 150a lie beneath and engage the rollers 100 at station 192. The members 150a continue to travel horizontally rearwardly for a short distance at the same speed as conveyor 20, following which they rise a short distance to break the cores free from the cones, again travel a short distance horizontally, and then to rise and simultaneously travel horizontally so as to trace the reverse crossing loop shown in FIG. 13. The roller 100 finally descends to station 193, where its mold bar 86 is received in the next adjacent core bar storage means 134, such storage means having travelled to station 193 during the time that the core bar has been travelling through the described path including the reverse loop. The angles at which the lower ends of the loop lie with respect to the vertical, taken with the horizontal travel of the molds, is such that the cores leave the mold cavities substantially along the axes thereof and enter the storage means 134 substantially normal thereto.

The forward core bar manipulating members 150b trace the same path as the members 150a in picking up a core bar from a core bar storage means 134 and reinserting the cores of such bar in the molds, now charged with batter, of the mold bar which lies immediately behind such storage means on the conveyor 20. The cores are centered longitudinally in the charged molds, after such reinsertion, by reason of the accurate positioning of the core bar rollers 100 in the V-shaped seats in the core bar lifting means 150b, and the accurate timing of the means 141b, 150b with respect to the travel of the molds. The vertical jogging of the core bars and cores does little to disturb such longitudinal centering, since the cores are erected at the lower terminus of each reciprocation of the cores by engagement between the shoulders 98 and 99, and are also closely held by the confronting annular outer surface of sleeve 94 on the core and the annular surface 88 in the mold. The core bar centering means 458, to be described, and the above described core erecting and guiding means on the core and mold, maintain the core laterally centered after its insertion in the mold, during the core jogging, and as the core bar is finally latched to the mold.

Cone Removal

As shown most clearly in FIGS. 2 and 4, the cone removing mechanism at the discharge station includes a transverse manifold 194 from which there depend ten suckers 195, one over each longitudinal row of molds. The lower end of the sucker is of downwardly diverging frusto-conical shape, such lower end being receivable within the upper end of the cone product. The manifold 194 and suckers 195 are supported and operated as follows.

Mounted on fixed structure above the machine is a transverse tubular rock shaft 196 to which parallel upper links 199 are secured by fittings 197 (FIG. 4). The other ends of the links 199 are pivotally secured by pivot means 201 to a drum 200 mounted on the upper end of a central tube 198 which supports the manifold 194. The interior of the tube 198 and thus of manifold 194 is periodically subjected to reduced pressure by a vacuum source which is connected to the upper end of the tube 198 through a flexible conduit 202. A lever arm 205 is connected to the rock shaft 196 by a second fitting 204, lever 205 being oscillated by means of a push rod 206 which is connected to the outer end of the lever by pivot pin 207. The lower end of the push rod 206 is connected to the outer end of a lever arm 209 by pivot pin 210, the lever 209 being fixedly secured to a rock shaft 211 journalled in fixed frame structure of the machine. Secured to shaft 211 is a further lever 212 having a cam follower roll 214 mounted on its free end. The cam follower 214 cooperates with a cam 215 which as shown in FIGS. 4 and 32 is fixedly connected to the transverse shaft 26 within cam case 78. The cam 215 is of such configuration and the lever arms and thrust rod forming the linkage between it and the tube 198 are of such sizes that they tend to reciprocate the tube 198 and the manifold 194 in a substantially vertical direction.

As the tube 198 is raised and lowered, however, it is oscillated in a longitudinal vertical plane so that it alternately lies in the full line, generally vertical position shown in FIG. 2 in which it cooperates with and tracks a cone to be discharged from a mold, and in a position shown in phantom lines wherein the suckers 195 overlie a discharge conveyor 237. Such oscillation of the tube 198 is effected by the following means. A fitting 216 is secured to the tube 198 intermediate its length, the fitting having spaced parallel vertically disposed ears to which an end of a link 217 is secured by a pivot pin 219. The other end of the link 217 is connected to the upper free end of a lever arm 220, fixedly connected to a rock shaft 222, by a pivot pin 221. A second lever arm 224 which is fixedly connected to the rock shaft 222 is pivotally connected at its free end by a pivot pin 225 to the upper end of a push rod 226. A lever arm 227 which is fixedly connected to a rock shaft 230 has the free end thereof connected to the rod 226 by a pivot pin 229. A lever arm 231 fixedly connected to the rock shaft 230 carries a cam follower roll 232 on its free end, such roll cooperating with a box cam 234 which is fixedly secured to the transverse driven shaft 26. The cam track of cam 234 has a configuration which is more clearly shown in FIG. 2.

The suckers 195 are employed to insure that the cone product will remain in the rear, fixed parts 47 of the mold cavities when the molds are opened. Thus, the suckers are introduced into the cones shortly before the cones are discharged from the molds, the suckers travelling horizontally with or tracking the cones in the molds for a short distance as the molds are being opened in the manner described above. The forward, movable mold parts 49 are then swung forwardly and downwardly (FIG. 2) about pivots 51. Immediately thereafter, the suckers 195 are moved forwardly (to the left) a short distance so as to pull the vertical and peripheral ribs on the cone product free from the grooves in the fixed rear portions 47 of the molds. Thereafter, the suckers are raised and are then swung clockwise, as above described, and released to fall onto conveyor 237.

The cone removing mechanism is provided with means which forcibly removes the cone from the sucker 195 when the sucker occupies the phantom line position thereof shown in FIG. 2. Such removal of the cone is accomplished by means including an elbow fitting which is secured to the manifold 194, such fitting being provided with a flexible feed conduit 236 through which compressed air is periodically applied (by the operation of valve 374, FIG. 25) to the suckers 195 after the suckers have been cut off from the vacuum source by the operation of valve 451 (FIG. 3). Cones received by the conveyor 237 are fed downwardly to a plurality of transversely aligned cone trimmers 539, to be described hereinafter, which shear any flash which may be present from the upper edge of the cone. Normally, the molds are, in effect, somewhat overcharged deliberately, so that the cones, when extracted from the molds, have an annular collar formed in the groove 97 and four ears, formed in the scallops or grooves 103, projecting upwardly from the annular collar.

Mold Charging Pump and Control

The batter metering pump is particularly shown in FIGS. 14–20a, inclusive, wherein it is generally designated 244. As shown in FIGS. 1 and 3, the pump is supported above conveyor 20 and the molds on horizontal support beams 245 affixed to the frame of the machine. Depending from an upper forward cross shaft 246 are two similar links 247, the lower ends of which are pivotally connected to the frame which carries the pump by stub pivot shafts 249. Similar depending links 251 are secured to a rear cross shaft 250 at their upper ends and by pivot stub shafts 252 to the pump supporting frame at their lower ends. A crank lever arm 254 which is fixedly connected to the rock shaft 250 adjacent frame plate 14 is pivotally connected to a thrust rod or link 255 by a pivot pin 256. The lower end of rod 255 is pivotally connected by a pivot pin 257 to the outer free end of a lever arm 259 which is fixedly secured to a cross shaft 260 (FIG. 5). A second lever arm 262, secured to shaft 260 outwardly of frame member 14, carries a cam follower 264 on its outer end, such cam follower cooperating with a cam 265 in cam case 183. Said cam is fixedly secured to the shaft 176 as shown in FIG. 5 and is of such configuration that the pump supporting frame and the pump body carried thereby are cyclically oscillated from a terminal or starting position by the linkage 262, 259, 255, 254, 251 to move in the same direction and at the same speed as the molds, that is, track the molds, during that portion of the cycle in which the pump is charging the molds with batter, thereby avoiding any spilling of the batter in such operation.

Turning now to FIGS. 14, 19 and 20, it will be seen that the pump unit 244 includes a frame which is cyclically reciprocated longitudinal of the machine as described above so as to move with the molds during the mold charging operation, and a pump body embodying a plurality of pumps and carried by the pump frame so as to be reciprocable therewith in the direction of travel of the molds. The pump body, however, is so mounted upon the pump frame that it may be selectively indexed in a direction transverse to the longitudinally moving molds so that successive molds in a moving longitudinal row thereof are charged by different successive pumps. This makes it possible for successive molds in each longitudinal row, i.e., a row consisting of corresponding molds in all of the mold bar assemblies, to produce cones of different composition, texture, and/or color. In the illustrative machine the pump is so constructed and arranged as to deliver four different batters to the molds of each series of four in one longitudinally moving row thereof.

The pump body supporting frame includes two spaced parallel members 270 which extend transversely of the machine, said members being joined by cross members 271. Members 272, in the form of inverted U's, are secured to the members 270 adjacent their ends, members 272 carrying upper horizontal track members 274 and lower track members 275 parallel thereto, as shown in FIG. 20. The pump body is provided at its opposite ends with vertical plate members 280 and 284. The pump assembly 276 includes a plurality of rollers 277 journalled on stub shafts 279. The tracks and the rollers permit the pump assembly 276 to be moved longitudinally of the frame members 270 (transversely of conveyor 20) through a distance which equals that between the center lines of the first and fourth of the molds in a transverse row thereof.

Affixed to the plate member 280 is a horizontal plate 281 which forms a platform, a vertical plate 282 being secured to the outer end of plate 281 (FIG. 18b). Beneath the plate 281 there are provided parallel depending ears 285; an eye 286 is pivotally connected to the ears 285 by a pivot pin 288. The eye 286 is adjustably mounted to the end of a push rod 287 which indexes the pump body transversely of conveyor 20 by means to be described.

The Pump Body

The pump body proper is designated 289. As shown in FIG. 20, such body is provided with four batter supply passages extending longitudinally thereof (transversely of the machine), such passages being designated, respectively, Y, G, B, and P for the colors yellow, green, brown, and pink of the four respective batters. The G passage designated 290 is connected by a cross passage 291 to its respective vertical passage 292 (FIG. 20a). The passage 292 connects at its lower end with a larger horizontal passage 294 which contains a batter pumping cylinder and piston and a rotary valve, to be described. The pump body 289 is maintained cool in order to avoid premature setting of dough or batter therein by the provision of cooling passages 293, 298 therein, cool water entering the passage 293 flowing through a cross conduit 303 and thence into the passage 298 to be discharged from the latter. It will be understood that the pump body 289 is provided with a plurality of vertical passages 292, there being 14 of auch passages in the embodiment shown, and that every fourth passage 292 is connected to a G supply passage, intervening passages 292 being connected to respective passages Y, B and P in sequence. Each passage 292 opens into a different horizontal passage or pump chamber 294.

Within each passage or chamber 294 there is fixedly positioned a pump sleeve 295 at one end thereof and a valve sleeve 296 in the other end thereof. The axially inner radially outer edge of the pump sleeve or cylinder 295 is provided with an annular groove 297 which receives the end of a flange 301 of a rotary valve having a body 299. A flange 300 extends radially from such body, the above-mentioned flange 301 extending axially from the outer edge of the flange 300. Disposed in alignment with the passage 292 is a pump discharge port 302 through which batter flows downwardly into the molds when the parts are in the correct position as described above. As shown in FIGS. 17 and 17a, the flange 301 of the valve is provided with a first lower port 304 and a second upper port 305.

The valve body 299 and the flange 301 thereon are turned from the valve closed position to receive batter (FIG. 17) into the valve open position to discharge batter (FIG. 17a) and vice versa by a valve operating lever arm 306 which is controlled in a manner to be described. When the valve is closed, with port 304 out of alignment with the discharge port 302 of the pump body, the port 305 of the valve is in registry with the passage 292. A pumping stroke of the pump piston with the valve in such closed position (FIG. 20) serves only to return a small amount of batter upwardly through passage 292 toward the batter supply means, not shown. When the valve is open as shown in FIG. 17a, port 304 is in registry with port 302, whereas port 305 of the valve is out of registry with passage 292. A batter dispensing stroke of the pump plunger, therefore, forwards batter from within the valve flange 301 downwardly through the pump discharge port 302 and into an open mold 40.

Each pump within the pump body 289 is provided with a piston 307 which slides within the sleeve 295. The pistons are driven to the right (FIG. 20) for a batter dispensing stroke by an elongated bar 313 which is connected to the outer end 309 of reduced diameter of all of the piston rods 308 of the pump pistons. The bar 313 is actuated by two similar parallel levers 312 which are affixed to a rock shaft 311 which is journalled at its ends in the plate members 280, 284 on the pump body. The lower ends of the lever arms 312 are connected to the bar 313 by means of links 314, one end of the links being connected to said bar and hence to the piston rods by pivot pins 315 and the other being connected to the lever arms 312 by pivot pins 316. Affixed to the shaft 311 at one end thereof (FIG. 14) is a lever arm 317 which is oscillated by a double-acting air cylinder 318 which is pivotally mounted upon the pump body by means of pivot shafts 319 which support it between plate members 280 and 282. The piston rod 320 of the cylinder 318 is provided with an ear 321 at its outer end, such ear being received in the clevis end of the lever arm 317 and pivotally connected thereto by a pin 322.

The Pump Valve Operating Means

As shown in FIGS. 14, 18a, 18b and 20, two horizontal sleeves extend across the top of the pump frame members 270 and are secured thereto; the right-hand sleeve in FIG. 14 is designated 324 and the left-hand sleeve is designated 325. Right- and left-hand bell cranks 326, 327 are mounted upon shafts 328 journalled in the respective sleeves. Such bell cranks have upper substantially vertical arms 329 and lower generally horizontal arms 332, the upper arms being connected for equal angular movement by connecting links 330 which are secured to the arms 329 by pivot pins 331. Vertical slides 334 are mounted in suitable guides on the pump frame, such slides being connected to the outer end of the respective lever arm 332 by a pivot pin 335. The slides 334, which move vertically through equal distances upon the rotation of the bell cranks 326, 327, have seats 336 at their lower ends (FIGS. 19 and 20), such seats receiving an insert block 337 of generally L cross section. The lower horizontal portion 339 of the insert block forms a continuous horizontal lower track. Integral with or secured to the insert block above and parallel to the lower track 339 is an interrupted upper track formed of two longitudinally spaced blocks 340 (FIGS. 15 and 15a). The lower track 339 and the upper track forming members 340 are spaced uniformly to form a roller confining track 342 which is of such width as accurately to receive roller 341 on the ends of the respective valve operating levers 306. It will be seen that the upper and lower track forming members 339 and 340, being mounted on the pump frame 270, are stationary in the direction transverse to the direction of conveyor travel, but oscillate with the pump and pump-carrying frame as the same are swung on supporting links 247, 251. Accordingly, the pump body 289 and the pump pistons and valves therein move along the length of the track member 339, 340 into a plurality (four are illustrated) of indexed positions therealong, one of which is shown in FIG. 15 and another of which is shown in FIG. 15a. The track forming members 339, 340 are selectively raised in order to close all of the valves 301 by reason of the engagement of all the rollers 341 with the lower track 339. It is while the track 339, 340 is raised and the valves are all closed (FIG. 17) that the pump body and valves are indexed by means to be described. When the track forming members 339, 340 are lowered, only those valves whose rollers 341 lie beneath the upper track members 340 are opened for the dispensing of batter to aligned molds thereeneath.

The selective raising and lowering of the track members 339, 340 is effected by a second double-acting air cylinder 345 (FIG. 14) which is pivotally secured at one end to a bracket affixed to one of the frame members 270. The piston rod 346 of motor 345 is provided with a clevis 347 at its outer end, the clevis receiving the upper end of a lever 349 therewithin and being connected thereto by a pivot pin 350. Lever 349 is rigidly connected with bell crank 327 and hence with bell crank 326 through links 330. Thus, oscillation of lever 349 effects vertical oscillation of track 339.

Valves Controlling Cylinders 318 and 345

As shown in FIGS. 1a, 25 and 32, a chain 354 extends from a sprocket 355 affixed to shaft 176 to a sprocket 356 affixed to a short horizontal shaft 357. Shaft 357, which extends outwardly through side frame member 15, carries on its outer end a cam drum 359 carrying three cams 360, 361 and 375. The cams 360 and 361 operate valves which control fluid pressure in cylinders 318 and 345, respectively. A cam follower roll 362 on a yoke 364 controls plungers of a valve 365 for the cylinder 318. A similar cam follower cooperating with cam 361 is supported on a yoke which operates a valve 366 for cylinder 345. Connected between the valve 365 and the cylinder 318 are inlet and outlet conduits 367 and 369 for the cylinder. Similar conduits 370 and 371 extend between the valve 366 and the cylinder 345. The cams 360 and 361 are provided with suitable lobes on their peripheries whereby to operate the double-acting piston-cylinder motors 318 and 345 in reverse directions in the desired time sequence.

Disposed on the cam drum 359 is a third cam 375 which operates a cone blow off valve 374. The valve 374 controls a source of compressed air, and at the required time discharges such air to the above-mentioned conduit 236 which is connected to the fitting 235 immediately above the suckers 195. A cam follower lever which extends from the valve 374 carries a cam follower roll 376 on its outer end. The cam 375 carries a single lobe which cooperates with the roll 376 to open the normally closed valve 374 at the proper time to blow the cones off the suckers 195. Thereafter, the valve is closed so that the sucker may be reconnected to a source of vacuum at the proper time as explained above.

The Pump Body Indexing Means

The above-described indexing of the pump body whereby it consecutively dispenses four different kinds of batter to four successive molds in a row of longitudinally aligned molds is effected as follows. A cam case 379 disposed on the left-hand side of the machine as it is viewed from the front or left in FIGS. 1 and 32 houses two peripheral cams 424 and 434 on cross shaft 176, and also a drive from the shaft 176 to a pump indexing box cam 384 journalled on a stub shaft 382. Such drive is by way of a pinion 380 affixed to the shaft 176 and a larger gear 381 meshing therewith (FIG. 24), such gear and box cam 384 being integral. A cam follower roll 385 (FIG. 1a) is journalled on the outer end of an arm 386 which is affixed to a stub shaft 387 journalled in the frame 15 of the machine. A second arm 389 extending oppositely from arm 386 is also affixed to the shaft 387. A first, lower link 390, connected to the arm 389 by a pivot pin 391, extends upwardly to be connected by a pin 392 to a first, generally horizontal arm 394 of a bell crank which is journalled on the frame of the machine at 395 (FIGS. 1a and 5). The second, generally vertical arm 396 of the bell crank is connected to the outer end of the above-discussed link 287 which is pivotally connected to an end of the pump body assembly 276. The cam 384, one suitable configuration of which is more particularly shown in FIG. 1a, is a four position cam whereby the pump body assembly 276 may be successively laterally indexed from a terminal position to three additional positions and returned either by similar indexing or a single continuous motion. The pivotal connectors 397 and 288 are of the type known as "Spherco" connectors which permit substantial misalignment between the connected parts without binding.

Core Bar Re-Insertion

After the pump 244 has dispensed the requisite metered quantity of batter into a transverse row of molds A (FIG. 3) travelling therebeneath, the core bar B which is held in the core bar storage means 134 immediately in advance of such row of molds on chains 20 is laterally centered, as hereinafter described, and lifted by the core bar lifting and transferring means 150b (FIGS. 3 and 12–13, inclusive) and is placed so that the cores are inserted into such recently charged molds A when the latter have moved to a position C near the entrance to a jogging track 406, 407 to be next described. The motion of the core bar while being thus transferred and re-inserted is the same as that which it had when it was removed from the molds (FIG. 13), the core bar lifting means "tracking" the molds, that is, moving the core bar horizontally with the molds in such manner that the cores enter the molds substantially centrally and in a vertical position concentric with the mold cavities. Upon the re-insertion of the cores 41 into the molds, the lugs 112 on core bar latching pawls 104 engage lobes 405 at the forward ends of horizontal tracks 404 of a core bar supporting and jogging means on both sides of the machine to thereby pivot the latch pawls to the phantom line position shown in FIG. 23.

A short time after the core bar is released by saddles 150b, the core bar rollers enter a core bar jogging track 406, 407, and the lugs 112 ride down onto the main extended parts of the tracks 404 which continue to hold the latches 104 out of engagement with pins 109.

Disposed laterally outwardly of the tracks 404 are the lower tracks 407 of the core jogging means, the opposite tracks 407 being laterally spaced for engagement by the rollers 100 on the opposite ends of the core bars 86. The tracks 404 are secured to tracks 407 and move in unison therewith in a manner and for a purpose to be next described.

The Core Jogging Means

The entering end of the track 407 which is inclined rearwardly and upwardly is so located relative to the rear end of the lobe 405 that as the dogs 112 on the core bar run down the rear ends of the lobes the rollers 100 on the ends of the core bars engage the track 407. The jogger also has upper horizontal tracks 406 which are parallel to the tracks 407 and spaced therefrom a distance slightly greater than the diameter of rollers 100. The upper and lower tracks 406 and 407 are connected by longitudinally spaced vertical strap members 409. The upper ends of the strap members 409 are connected by pivot pins 410 to the outer ends of first generally horizontal upper arms 411 of pairs of bell crank levers 412, 414 that are pivotally mounted at 413 on fixed brackets 418. The rear lever 414 has a vertical arm 415 which is connected to the vertical arm 416 of the forward bell crank lever 412 by a link 417 which is connected at its rear end by a pivot pin 419 to the arm 415 and at its forward end by pivot pin 420 to the arm 416. Since the stub shafts 413 are located in the same horizontal plane and the arms 415 and 416 of the bell crank levers connected by the link 417 are of equal length, the tracks 406, 407 of the jogging means are maintained parallel and horizontal at all times.

The tracks 404, 406 and 407 of the jogging means are moved vertically through a short distance a number of times during the travel of the rolls 100 of a core bar rearwardly between the tracks 406, 407, thereby vertically jogging the core bars and the cores thereon. In the present embodiment the core bar is raised and lowered through a total of six cycles during such travel of a core bar. The jogging means insures the complete filling of the void in each mold cavity between the mold and the core, and permits gas and steam to escape from the molds before the cores are clamped and locked in their fully inserted position.

The drive for the tracks of the jogging means is effected as follows. A cross shaft 422, journalled at its opposite ends in the side frame members of the machine, has an arm 424 affixed thereto, such arm carrying a cam follower roll 425 which cooperates with a core jogging cam 426 affixed to shaft 176. Such cam, the cam follower, and the arm 424 are located within the cam case 379 as shown in FIG. 1a. Inwardly of the side frame members of the machine there is fixedly mounted at each end of the cross shaft 422 a second arm 427. The upper free end of each arm 427 is connected to the rear end of a respective link 429 by a pivot pin 430, the forward end of each link 429 being connected to the respective vertical arm 416 of the forward bell crank lever by a pivot pin 431.

Vacuum for Cone Transfer

Affixed to the shaft 176 within the cam case 379 there is a cam 434 (FIG. 24) which actuates the vacuum valve 451 for supplying reduced pressure to the suckers 195. A lever arm 435 (FIG. 3) affixed to a shaft 436 carries a cam follower roll 438 cooperating with the cam 434. A lever arm 437 affixed to shaft 436 is connected to an upwardly extending link 439 by a pivot pin 440 at its lower end. The upper end of the link 439 is connected by a pivot pin 441 to an arm 442 which is connected to a cross shaft 444. Also affixed to such shaft is a second upstanding arm 445, the upper end of which is connected to a cross link 446 by a pivot pin 447. The other end of the link 446 is pivotally connected by a clevis and pin connection 449 to the valve rod 450 of the vacuum valve 451. The valve 451 is connected by the flexible conduit 202 to the manifold 194 to which the cone extracting suckers 195 are connected. The valve is also connected to a suitable source of vacuum (not shown) through a conduit 452. The cam 434 and the linkage between it and the valve 451 is so constructed and arranged that vacuum is applied to the suckers 195 only when the suckers have been inserted into the tops of the baked cones in the molds (FIG. 2), and that vacuum is cut off from the suckers when they are in the cone discharge position thereof shown in phantom lines in FIG. 2.

Core Bar Centering Means

Since the core bars and the cores carried thereby may get out of lateral alignment with the molds during the time that they are removed therefrom and transferred to and from the core bar storage means, and to guard against this possibility, the apparatus may be provided with means which centers the core bars laterally with respect to the rows of molds to which they are to be applied. Core bar centering means 458 are accordingly provided in the machine, such means, which is shown more particularly in FIGS. 30 and 31, being mounted upon the rear members 141b which lift the core bars from the storage means 134 on the chains 20 and lower them onto the mold bar assemblies which have been charged with batter. One such core centering means is shown carried by the right-hand member 141b in FIG. 30. It is to be understood that the opposite member 141b carries a similar core bar centering means but of opposite hand.

The core bar centering means 458 is provided with a body 461 which is affixed to the horizontal plate portion 459 of the core bar lifting means 150b. Mounted on the body 461 is a pawl 462 which pivots about a vertical pivot pin 464 connecting it to the body 461. The pawl is provided with a cam plate 465, the laterally inner surface of which is convexly curved as shown (FIG. 31) and is so positioned vertically as to cooperate with the outer ends of the stub shafts on the core bars 86 which carry rollers 100. The cam 465 is secured to the pawl by machine screws 466 as shown. The pawl is forcibly urged counterclockwise about the axis of the pivot pin 464 (FIG. 31) by a coil compression spring 469, the outer end of which receives a spring guide pin 470 affixed to a vertical abutment plate 467. The spring 469 constantly urges the pawl 462 toward a terminal inner position in which the pawl contacts an abutment member 471 on the body 461. The two opposing core bar centering means are so disposed on their respective members 141b that when a core bar is correctly centered it will move between cam plates 465 without engaging the same. If, however, the core bar is out of alignment laterally of the conveyor 20 and cores 40, one end will engage one of the cam plates 465 and be forced by spring 469 laterally of the machine to the extent permitted by stop 471. The core bar will thus be centered with respect to the molds as the core bar is being transferred by means 150b.

The Core Bar Latch Closing Means

The machine is provided with core bar latch actuating means 474-476 on each side thereof (FIGS. 1, 3 and 26) which are disposed immediately to the rear of the core bar jogging means. On each side of the machine there is provided at such location an L-shaped overarm 474, the vertical portion of which is secured to the upper edge of the respective frame plate 14, 15 and the upper portion of which extends laterally inwardly toward the molds. Such upper portion of each overarm carries a downwardly facing generally horizontal track 475, the forward lower surface of which is inclined to form a ramp so that the rollers 100 on the core bars may enter therebeneath. An upwardly extending flange 479 on the upper portion of the overarm 474 carries a horizontal stub shaft 477, such shaft journalling a roll 476 on its inner end. The axis of the shaft 477 lies in a vertical transverse plane which substantially coincides with the zone of the track 475 wherein the lower surface thereof becomes horizontal. As the core bars 86 travel with the molds into which the cores thereon have been inserted, they are thrust downwardly by track 475 toward the molds against the opposition of the coil compression springs 95 (FIG. 11) which are interposed betweeen the cores 41 and the core bars 86. This permits the pivoted latches 104, 112 at each end of a core bar, which are no longer supported by track 404, to swing downwardly in a clockwise direction (FIG. 26) so that the finger 107 on each latch underlies the respective latch pin 109 on the mold bar 47. The roll 476 then engages an upstanding lug 480 on the upper outer end of the latch member 104 as it passes beneath the roll so as to force the latch members 104 into their fully engaged locking position to secure the core bar 86 to the mold bar 47 during passage thereof through the oven 11.

The Core Bar Latch Position Detecting Means

On each side of the machine rearwardly of but close to the core bar latch closing means there is disposed a latch position detecting means 483 as indicated in FIGs. 1, 3, 28 and 29. A vertical frame member 484 carries an overarm 485 fixedly secured thereto, such overarm carrying a horizontal transverse sleeve 486 on its lower inner end. A shaft 487 journalled in the sleeve 486 carries a detecting arm 489 which is fixedly connected thereto. The arm 489, which extends rearwardly from the shaft 487, is positioned to underlie the rollers 100 on its respective end of the core bars. The upper surface of arm 489 has a first upwardly inclined ramp-like portion 490 and a generally horizontal gently curved portion 491 at its rear end. The arm 489 is constantly urged toward a terminal counterclockwise position thereof (FIG. 28) in the following manner. A crank arm 492 affixed to the outer end of the shaft 487 extends downwardly therefrom. A horizontal rod 494 which has a clevis 495 on its inner end is connected to the arm 492 somewhat above its lower end by a pivot pin 496. The outer end of the rod 494 carries a flanged sleeve 500, the flanges on the sleeve lying on opposite sides of a block 497 which is fixedly attached to a fixed frame part 499. The rod 494 is free for sliding within the sleeve 500 to a limited degree, movement of the rod to the right (FIG. 28) being terminated by engagement between a nut 501 adjustably mounted on the end of the rod with the end of the sleeve 500. The rod 494 is constantly urged into such terminal position, and thus the arm 489 is constantly thrust toward its upper terminal position, by a coil compression spring 502 which acts between an abutment collar on the rod 494 and the inner end of the sleeve 500.

The lower end of the arm 492 is provided with an abutment finger 504 at its lower end. A switch 505 is mounted on the frame adjacent the arm 492, a crank 506 on the operating shaft of the switch carrying a roller 507 which abuts the member 504 on the arm 492. The switch is thus normally held in circuit closing position by spring 502. Switch 505 opens when a roller 100 of a locked core bar 86 engages and passes over lever arm 489 to pivot arm 492 clockwise (FIG. 28) and release lever 506. However, when the roller 100 of an unlatched core bar passes over lever arm 489, the latter will not be depressed sufficiently to permit switch 505 to open. The switches 505 of the two detectors on opposite sides of the machine are connected in parallel and are interposed in a control circuit for the motor 21 which drives conveyor 20 and other parts of the machine.

A second switch 509 (FIG. 25), which is normally open, is interposed in the control circuit in series with the two parallel connected switches 505. Switch 509 has an operating shaft 510 to which is fixedly connected an arm 511 bearing a roller 512 on its outer end. The roller 512 cooperates with the cam 375, the switch 509 being closed during each passage of the single lobe of the cam past the switch operating roller 512. The parts are so constructed and arranged that the lobe of the cam 375 engages the roller 512 each time that a roll 100 on a core bar passes the detector lever 489. The control circuit is so arranged that if either of the two switches 505 thereof should remain closed when switch 509 is closed, the motor 21 will be stopped. Thus, should a core bar 86 not be properly locked to its mold bar 47 at either end, the respective detecting arm 489 will remain fully or partially elevated as the roller 100 rides thereover. Under such conditions the switch 505 operated by such arm 489 will remain closed and the motor 21 will be de-energized to stop the machine.

The Drives at the Forward End of the Machine

Inwardly of the side frame plate 14 and of the gear case 28 mounted on the outer side thereof there is a sprocket 514 which is affixed to the shaft 26 (FIGS. 4 and 32). A chain 515 extends from the sprocket 514 to a sprocket on an intermediate stub shaft 516, the shaft 516 driving a cross shaft 517 through a gear set 519. A chain 520 extends in generally vertical runs between a sprocket 521 on shaft 517 and a sprocket 522 on a lower shaft 524 of an upper cone conveyor. Such conveyor has a second upper shaft 525, the shafts 524 and 525 being connected by parallel conveyor chains 526 entrained over sprockets 527 on shaft 524 and sprockets 529 on shaft 525. Beneath the upper conveyor there is disposed an inclined chute made up of an upper portion 530 and a lower portion 531 which lie at a slight angle with respect to each other as shown in FIG. 2. The chute is divided by longitudinally extending vertical partitions 532 which form a plurality (10 shown) of channels, each of which is aligned with a respective longitudinally extending row of molds and a sucker 195. Cross members 534, which are secured at their opposite ends to the respective chains 526, carry a plurality of equally spaced transverse partition or paddle members 535, such partitions, when confronting the chute 530, 531, forming a plurality of sequentially travelling compartments, each of which receives a single cone or cup discharged from the molds and sucker in its particular row.

The Cone Trimmer

The chute 531, which is provided with relatively shallow partitions 532 which serve to maintain the cones in the various rows thereof separated from each other, discharges the cones to a plurality of cone trimmers 539 (FIGS. 1 and 2), there being 10 cone trimmers, one for each longitudinal row of molds 40. As shown in FIG. 2, each of the cone trimmers has a male die 541, such male dies being mounted in a row upon a common cross slide 540. Slide 540 is guided for vertical reciprocation by two fixed vertical guide rods 542 which are received in passages in the respective ends of the cross slide. Mounted on a fixed frame part of the machine in alignment with the respective male dies are 10 female dies 544 which are disposed in alignment with and below the lower end of the chute 531 so that individual cones discharged upon such chute slide downwardly in upright position and into the opening in the female die, when the male dies are in elevated position. The cones or cups remain suspended in the female dies by engagement between the upper enlarged collar thereon and the upper end of the female die. Upom the descent of the male die 541 into the cone, the upper collar on the cone as baked and any excess portions of the cones at such locations, such as flash, are sheared from the cone which then passes downwardly through the female die and into a discharge chute 545 which is provided with partitions 546 so as to maintain the cones baked in the molds of the respective longitudinal rows of molds separated from each other.

The slide 540 of the cone trimmer is vertically reciprocated in the following manner. A cam 547 is affixed to the lefthand (FIG. 27) end of the cross drive shaft 26. The cam 547 drives a trimmer rock shaft 549 (FIGS. 2 and 4) through the medium of a cam follower arm 550 affixed to the shaft 549 and a cam follower roll 551 on the outer end of the arm 550. Two similar laterally spaced arms 552 are affixed to the shaft 549, the outer end of each being pivotally connected to the lower end of a respective thrust rod 554 by a pivot pin 555. The upper end of each rod 554 is connected to the slide 540 by a pivot pin 557. The cam 547 and the described driving linkage between it and the slide 540 are so constructed and arranged that the slide makes one complete cycle of reciprocation between the delivery of successive cones to the cone trimmer.

Drive for Conveyor 12

Shaft 517 carries a sprocket 559 which is affixed thereto, a chain 560 being entrained over said sprocket and a further sprocket 561 affixed to a shaft 562 at the cone-entering end of the conveyor 12. Conveyor 12 is provided with an endless belt 564 which rests upon and is driven by pulleys on the shaft 562. The upper, operative run of the belt 564 travels along an upper, belt-supporting table 565, the lower run of the belt being supported by a lower table 566. Preferably, the upper table 565 is provided with longitudinally extending vertical partitions which maintain the cones delivered from the various longitudinally extending rows of the molds separated from each other. This permits a four color cone pack to be formed from the cones issuing from each row of molds when the batter-delivering pump 244 is supplied and operated in the manner above described.

Although only one embodiment of the invention is illustrated in the accompanying drawings and described in the foregoing specification, it is to be expressly understood that various changes, such as in the relative arrangement and dimensions of the parts, may be made therein without departing from the spirit and scope of the invention, as will now be apparent to those skilled in the art.

What is claimed is:

1. Apparatus comprising a conveyor carrying a plurality of longitudinally spaced molds and interfitted cores, a plurality of core storage means on the conveyor, said storage means alternating with the molds longitudinally of the conveyor, a first core manipulating means for removing the cores from the molds and temporarily storing the removed cores on said storage means, and a second core manipulating means downstream of the first core manipulating means for removing the cores from said storage means and reinserting them in the molds.

2. Apparatus according to claim 1, wherein the core storage means and the molds are disposed in alignment on the conveyor.

3. Apparatus according to claim 1, wherein the first and second core manipulating means comprise means for lifting cores from a first mold and a first core storage means, respectively, moving the cores so as to track the conveyor until the cores have cleared the respective first mold and first core storage means, temporarily maintaining the cores elevated while the conveyor advances relative thereto, and lowering the cores into a second core storage means and a second mold, respectively, while moving the cores so as to track the conveyor.

4. Apparatus according to claim 3, wherein the first mold leads the second storage means and the first storage means leads the second mold.

5. Apparatus according to claim 3, wherein the molds and core storage means are uniformly longitudinally spaced on the conveyor and the first and second core manipulating means are similar and include core lifting and traversing means connected so as to move as a unit, said first and second core manipulating means being spaced longitudinally of the conveyor a distance which is a multiple of the longitudinal distance between a core storage means and an adjacent mold on the conveyor.

6. Apparatus comprising a conveyor carrying a plurality of longitudinally spaced molds and interfitted cores, the molds being on transversely-disposed mold bars, the cores being supported by transversely-disposed core bars from which the cores extend and the core bars overlying the mold bars when the cores are interfitted with the molds, a first core manipulating means for removing the cores from the molds and temporarily storing the removed cores on the conveyor, a second core manipulating means downstream of the first means for removing the cores from storage on the conveyor and reinserting them in the molds, and means for selectively latching each core bar to an underlying mold bar.

7. Apparatus according to claim 6, wherein the conveyor is endless and comprises transversely-spaced parallel chains, and the mold bars are uniformly spaced longitudinally and are connected at their ends to the chains.

8. Apparatus according to claim 6, wherein the core bars are provided with means at their opposite ends adapted to be engaged by the first and second core manipulating means.

9. Apparatus according to claim 8, wherein said means at the ends of the core bars comprises rollers, and the first and second core manipulating means comprise means providing concave seats for receiving the rollers.

10. Apparatus according to claim 8, comprising means for centering the core bars and the cores carried thereby transversely relative to the molds.

11. Apparatus according to claim 10, wherein the core bar centering means is disposed on the second core manipulating means.

12. Apparatus according to claim 10, wherein the core bar centering means comprises confronting similar spring pressed cam members mounted on the second core manipulating means for engaging core bars at their opposite ends.

13. Apparatus comprising conveyor means, two longitudinally spaced molds carried by the conveyor means, a core for said molds interfittable therewith, storage means on the conveyor means for storing the core between said molds, and means operable while the conveyor means is moving with the molds for lifting said core from the leading one of said molds, lowering said core onto said storage means and subsequently lifting said core from said storage means and lowering it into the trailing one of said molds.

14. Apparatus comprising a continuously moving endless conveyor, a plurality of aligned longitudinally spaced molds carried by the conveyor, a core for said molds interfittable therewith, means on the conveyor for supporting said core between each pair of successive molds, and core transfer means for successively cyclically transferring said core from a mold to the adjacent trailing core supporting means and then from said supporting means to the adjacent trailing mold.

15. Apparatus as defined in claim 14 wherein the transfer cycle for the core from mold-to-supporting means-to-mold occurs once during each cycle of the conveyor.

16. Apparatus comprising a continuously moving endless conveyor, at least two longitudinally spaced and aligned molds carried by the conveyor, each said mold comprising separable parts whereby the same may be opened to permit the discharge of a molded product therefrom, a core for said molds interfittable therewith, core storage means on the conveyor for supporting the core between said molds, means for locking the core in the cavity of the leading one of said molds, means for releasing said locking means, means for transferring the unlocked core from said leading mold to said storage means, for opening and closing said leading mold, means for transferring said core from said storage means to the trailing one of said molds, and means for activating said locking means to lock the core in said trailing mold.

17. Apparatus as defined in claim 16 wherein the separable parts of each mold are pivotally connected at the end opposite the end through which the core is removed.

18. Apparatus as defined in claim 16 wherein the means for releasing the core locking means is responsive to movement of the conveyor.

19. Apparatus as defined in claim 16 comprising means for removing the molded product from the mold while the same is open.

20. Apparatus as defined in claim 16 comprising means for jogging said core in the cavity of the trailing mold preparatory to activating the locking means.

21. Apparatus comprising a split mold including a first, relatively fixed mold part and a second mold part pivotally connected and movable relative thereto and cooperable therewith to form a cavity, means for opening and closing the mold comprising a crank arm journalled on one of the mold parts and extending generally away from the other mold part, a link in the form of a tension spring extending from the outer end of the crank arm to the other mold part, means for oscillating the crank arm between a mold-closed position, wherein the crank arm lies beyond dead center in one direction with the spring under marked tension to hold the mold closed, and a mold-open position, wherein the crank arm lies beyond dead center in the other direction with the spring relatively relaxed, said crank arm oscillating means comprising a linkage having pivotally connected first and second levers, the first lever being pivotally connected to the fixed mold part and the second lever being pivotally connected to the crank arm, conveyor means on which said mold and said mold opening and closing means is carried, cam means cooperable with said first lever to effect oscillation of the latter about its pivotal connection to the fixed mold part to thereby open and close the mold, cores interfittable with said mold, means for supporting said cores on the conveyor means outside of the mold, and means for transferring a core from the mold to the core supporting means and from the core supporting means to the mold while the conveyor means is in motion.

* * * * *